United States Patent
Stevens et al.

(10) Patent No.: US 12,549,646 B1
(45) Date of Patent: Feb. 10, 2026

(54) 5G TACTICAL ACCESS POINT PROXY (TAPP)

(71) Applicant: Rockwell Collins, Inc., Cedar Rapids, IA (US)

(72) Inventors: James A. Stevens, Lucas, TX (US); Jeffrey D. Bouis, Frisco, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 554 days.

(21) Appl. No.: 17/948,000

(22) Filed: Sep. 19, 2022

(51) Int. Cl.
| | |
|---|---|
| *H04L 69/08* | (2022.01) |
| *H04W 12/06* | (2021.01) |
| *H04W 12/106* | (2021.01) |
| *H04W 28/06* | (2009.01) |
| *H04W 88/16* | (2009.01) |

(52) U.S. Cl.
CPC ............. *H04L 69/08* (2013.01); *H04W 12/06* (2013.01); *H04W 12/106* (2021.01); *H04W 28/06* (2013.01); *H04W 88/16* (2013.01)

(58) Field of Classification Search
CPC ...... H04L 69/08; H04L 69/085; H04W 12/06; H04W 12/106; H04W 28/06; H04W 88/16; H04W 12/062; H04W 12/065; H04W 12/068; H04W 12/069
See application file for complete search history.

(56) References Cited

U.S. PATENT DOCUMENTS

| | | | |
|---|---|---|---|
| 10,952,177 B2 | 3/2021 | Chandramouli et al. | |
| 11,096,036 B2 | 8/2021 | Poornachandran et al. | |
| 2011/0243024 A1* | 10/2011 | Osterling | H04L 67/104 370/252 |
| 2019/0335373 A1* | 10/2019 | Kang | H04L 69/03 |
| 2020/0178121 A1* | 6/2020 | Simon | H04W 28/065 |
| 2021/0105617 A1 | 4/2021 | Mo | |
| 2021/0120408 A1* | 4/2021 | Pazhyannur | H04L 63/101 |
| 2021/0168684 A1 | 6/2021 | Kang et al. | |
| 2021/0250800 A1 | 8/2021 | Meredith et al. | |
| 2021/0281493 A1 | 9/2021 | Miller et al. | |
| 2021/0306899 A1 | 9/2021 | Mishra et al. | |
| 2022/0078872 A1 | 3/2022 | Shrestha et al. | |
| 2022/0132455 A1 | 4/2022 | Gupta et al. | |

(Continued)

FOREIGN PATENT DOCUMENTS

| | | | | |
|---|---|---|---|---|
| EP | 2474178 A1 | 7/2012 | | |
| WO | WO-2017107623 A1 * | 6/2017 | ............. | H04L 29/06 |
| WO | 2020226979 A2 | 11/2020 | | |

*Primary Examiner* — Jeffrey M Rutkowski
(74) *Attorney, Agent, or Firm* — Suiter Swantz IP

(57) ABSTRACT

The US Department of Defense is rapidly moving to incorporate 5G in its networking capabilities. Incorporating 5G should be done in secure manner, especially in contested environments. Indeed, 5G UEs are typically located at the tactical edge, while the 5G Core Network is located safely away from the operational theater. The 5G base stations may be near the edge or further back, but come with their own operational issues in a battle scenario. By utilizing the N3IWF/TNGF functionality, but replacing the Access Point with a secure tactical network, UEs can securely reach back to the 5G Core Network with greatly reduced overhead. The UE's communication remains robust even in the presence of reduced spectrum availability and/or intentional jamming by an enemy actor by using secure tactical networks and radios in a contested environment.

20 Claims, 26 Drawing Sheets

600a

(56) References Cited

U.S. PATENT DOCUMENTS

2022/0141708 A1* 5/2022 Arrobo Vidal .......... H04L 69/22
370/329
2025/0351074 A1* 11/2025 Hu .................... H04W 52/0216

* cited by examiner

5G TACTICAL ACCESS POINT PROXY (TAPP)

TECHNICAL FIELD

The present invention generally relates to wireless communication, and more specifically communications according to 3GPP standards

BACKGROUND

The 5G specifications allow a mobile device to access the 5G Core Network using only a Wi-Fi interface. The mobile device connects to an Access Point, which connects to a 5G non-3GPP interworking function (N3IWF) and/or a trusted non-3GPP gateway function (TNGF). The 5G N3IWF/TNGF connects to the Core Network. But the specifications also impose multiple security protocol layers which result in significant additional over-the-air bandwidth. Thus, a mobile device can use an Access Point to reach the 5G Core Network, but only at the cost of incurring considerable protocol overhead. Therefore, it would be advantageous to provide a device, system, and method that cures the shortcomings described above that can work with a variety of non-3GPP wireless communications including non-Wi-Fi and/or Wi-Fi.

SUMMARY

A system is described, in accordance with one or more embodiments of the present disclosure. In some embodiments, the system includes a memory maintaining program instructions. In some embodiments, the system includes a processor configured to execute the program instructions. In some embodiments, the program instructions cause the processor to execute a tactical access point proxy function (TAPP). In some embodiments, the tactical access point proxy function (TAPP) includes proxying a third-generation partnership project (3GPP) security function into a non-3GPP security function for reducing overhead when communicating a message over a secure non-3GPP waveform. In some embodiments, the overhead corresponds to messaging traffic from at least one of a control plane or a user plane of a 3GPP protocol stack used to connect a user equipment (UE) to a 5G core network by way of a Wi-Fi access point.

A method is described, in accordance with one or more embodiments of the present disclosure. In some embodiments, the method includes proxying a third-generation partnership project (3GPP) security function into a non-3GPP security function for reducing an overhead when communicating a message over a secure non-3GPP waveform. In some environments, the secure non-3GPP waveform could be a secure tactical waveform such as Warrior Robust Enhanced Network (WREN). In some embodiments, the overhead corresponds to at least one of a control plane or a user plane of a 3GPP protocol stack. In some embodiments, proxying the 3GPP security function into the non-3GPP security function includes removing a plurality of protocol layers prior to transmission across the tactical waveform for reducing an over-the-air bandwidth of the transmission. In some embodiments, proxying the 3GPP security function into the non-3GPP security function includes adding the plurality of protocol layers in response to receiving the message over the secure non-3GPP waveform. In some embodiments, the plurality of protocol layers are from the user plane.

A system is described, in accordance with one or more embodiments of the present disclosure. In some embodiments, the system includes a memory maintaining program instructions. In some embodiments, the system includes a processor configured to execute the program instructions. In some embodiments, the program instructions cause the processor to execute a tactical access point proxy function (TAPP). In some embodiments, the tactical access point proxy function (TAPP) includes proxying a third-generation partnership project (3GPP) full duplex voice function into a non-3GPP radio access technology (RAT) voice function for reducing an overhead when communicating over a secure non-3GPP waveform. In some embodiments, the non-3GPP waveform could be a waveform with a half-duplex push-to-talk (PTT) voice service. In some embodiments, the overhead corresponds to a 3GPP protocol stack used to connect a user equipment (UE) to a 5G core network by way of a Wi-Fi access point.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
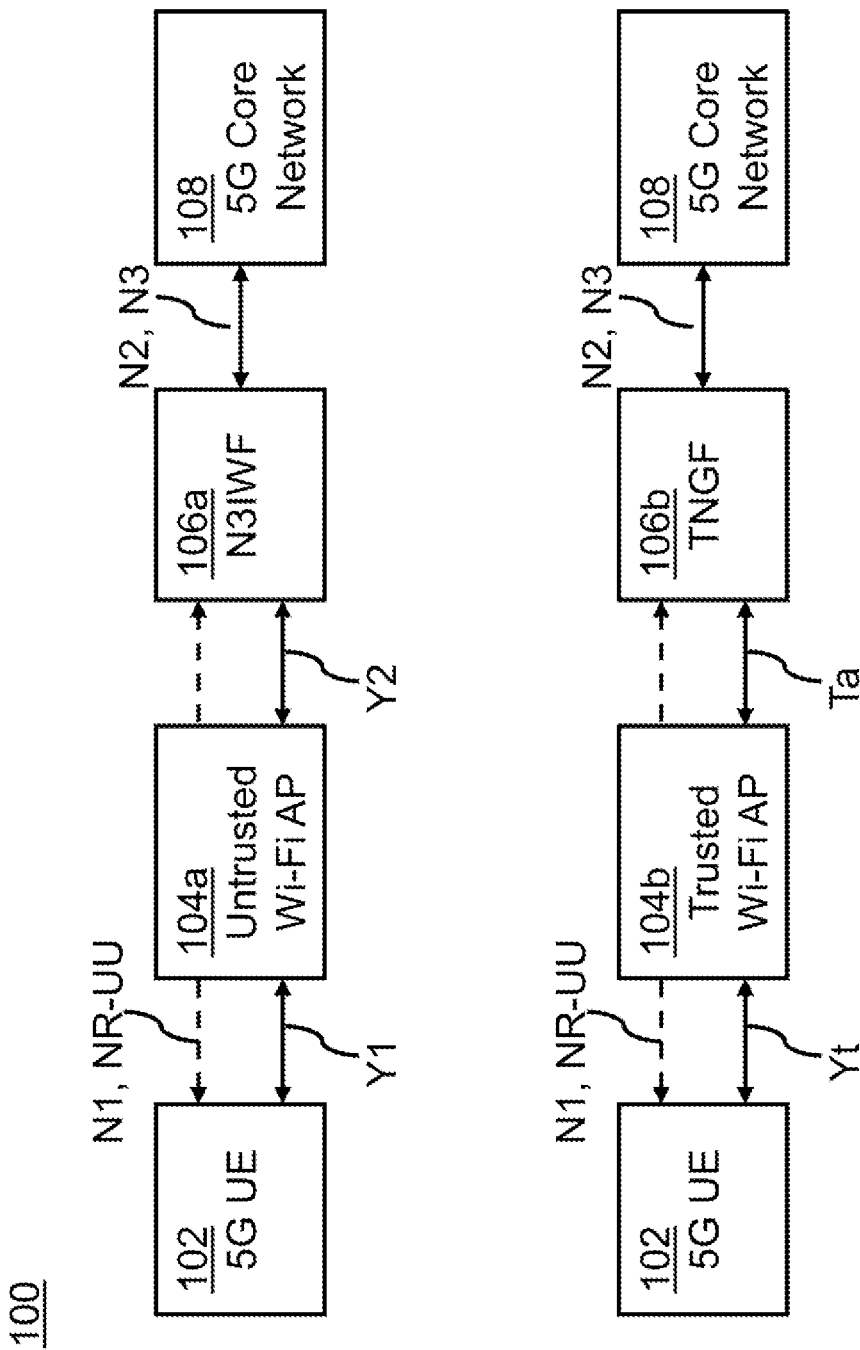
FIG. 1 depicts a simplified block diagram of a system, in accordance with the prior art.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings.

A gateway function connects various Radio Access Technologies (RATs), including 5G Radio Access Networks (RANs) or WiFi, to the 5G Core. The gateway function interfaces to the 5G core with standard 5G interfaces for control and user traffic. The gateway function could be a 3GPP base station for 4G/LTE, 5G (called a gNode-B or gNB), or even future 6G. The gateway function for non-3GPP is N3IWF for untrusted non-3GPP networks and TNGF for trusted non-3GPP networks. Additional security is added between a WiFi UE and the N3IWF and TNGF which adds additional overhead to the WiFi RAT. Embodiments of the present disclosure replaces or proxies the standard security used with N3IWF and TNGF with the secure non-3GPP waveform security. Advantageously, the function may take advantage of features provided by non-3GPP RAT to reduce the overhead imposed by 3GPP standards for interfacing to non-3GPP RATs.

Embodiments of the present disclosure are directed to non-3GPP WiFi with a secure non-3GPP waveform, such as a secure tactical waveform. The tactical waveforms may include built-in secure IP radio service and authentication security (for example, WREN, TTNT, or others). The waveform may provide security and encryption without the additional protocol overhead of the 5G waveform. The present disclosure also describes a Tactical Access Point Proxy (TAPP) function which interfaces between the tactical waveform, the mobile device, and the N3IWF or TNGF. The TAPP removes IPSec and related protocol headers prior to transmission over the secure waveform, and restores these headers on the receiving end. Restoring the headers on the receiving end ensures compliance with 5G standards while achieving reduced over-the-air bandwidth. The TAPP allows any 5G mobile device at the tactical edge to securely reach to the 5G Core Network with significantly less over-the-air protocol overhead and/or bandwidth than the standard 5G solution. This functionality gives the Department of Defense (DoD) the flexibility to deploy standard 5G mobile devices into highly contested environments. The functionality may be advantageous in guaranteeing secure communication by the use of secure non-3GPP waveforms, especially secure tactical waveforms, while simultaneously maximizing data bandwidth for the warfighter.

A number of abbreviations are now described. Further documentation may be found in any number of 3GPP releases, such as, but not limited, 3GPP Release 15 or 3GPP Release 16.

Third generation partnership project (3GPP). 3GPP defines the standards for cellular telecommunications including 4G/LTE, 5G, and future 6G.

5G core network (5GC). The 5GC may be used to connect to a 5G network. Recitations of 5GC may also be apply for 4G/LTE, future 6G cellular standards, or any cellular core network defined by 3GPP standards.

User equipment (UE). The UE may include a 3GPP compliant or non-3GPP compliant device.

Access Point (AP). The AP may include a Wi-Fi AP, such as an untrusted Wi-Fi AP configured to access a N3IWF or a trusted Wi-Fi AP configured to access a TNGF.

Extensible authentication protocol (EAP). EAP may provide an authentication framework for network connections.

Internet key exchange (IKE). IKE may include one or more versions such as IKEv2. IKE may be used to set up a SA in an IPSec protocol suite.

Internet Protocol (IP). IP may refer to a network layer in a communications protocol. Waveform (WF) IP may refer to a network layer in a secure non-3GPP waveform.

Inner IP may refer to an IP network encapsulated inside another network layer.

Internet protocol security (IPSec). IPSec may refer to a protocol to authenticate and encrypt communication over an IP network.

Generic Routing Encapsulation (GRE). GRE may refer to a tunneling protocol.

Radio Access Technology (RAT). RAT may refer to a wireless communication capability other than 3GPP.

Radio Access Network (RAN). The RAN may link UE to a 5G base station (gNode-B).

Layer 1 (L1). L1 may refer to a wired physical layer transmission and reception (such as Ethernet) or a wireless physical layer transmission and reception (such as Bluetooth).

Waveform (WF) L1 may refer to a wired or wireless physical layer transmission over a secure non-3GPP waveform.

Layer 2 (L2). L2 may refer to a wired media access channel layer (such as Ethernet) or a wireless media access channel layer (such as Bluetooth).

Waveform (WF) L2 may refer to a wired or wireless media access channel layer over a secure non-3GPP waveform.

Transparent interface (N1). N1 may be provided between UE and 5GC.

Control plane interface (N2). N2 may be provided between a RAN and 5GC.

User Plane interface (N3). N3 may be provided between RAN and 5GC.

Non-3GPP Interworking Function (N3IWF). N3IWF may refer to an untrusted gateway function between a non-3GPP RAT and 5GC.

Non-Access Stratum (NAS). NAS may be a functional layer in a 5G protocol stack.

(NR-UU) may refer to a reference point between a 5G UE and a 5G gNode-B.

(NWu) may refer to a reference point between a UE and N3IWF for establishing tunnels over an untrusted RAT.

(NWt) may refer to a reference point between a UE and TNGF for establishing tunnels over a trusted RAT.

Application sessions may be formed between a UE and a 5GC. For example, the application sessions may include web browsing, email, or voice.

Security Association (SA). An SA may be the establishment of shared security attributes between the UE and the N3IWF or TNGF to support secure communications.

Security Function may refer to a method for authenticating communication between nodes in a network. The security function may authenticate the communication by one or more layers in a protocol stack. A 3GPP security function may refer to a security function defined in 3GPP standards. A non-3GPP security function may refer to a security function not defined in 3GPP standards.

(Ta) may refer to the interface between a Trusted Wi-Fi AP and the TNGF.

Tactical Access Point Proxy (TAPP). TAPP may refer to a software function executable to implement any of the various functions described herein. TAPP functions may include transmission side proxying and receiver side proxying. TAPP may include mapping a non-3GPP Radio Access Technology (RAT) into a 3GPP core network using 3GPP standards. As used herein, proxy may refer to replacing security protocols (e.g., 3GPP security protocols; tactical security protocols) with other security protocols. The TAPP function may use built in security of a radio and map the security to the 3GPP services. The TAPP function may also take the voice service of the radio, which may be push-to-talk voice without voice over IP, and map it into the voice service of the UE.

Trusted Non-3GPP Gateway Function (TNGF). TNGF may refer to a trusted gateway function between a non-3GPP RAT and 5GC.

Tactical Targeting Network Technology (TTNT). TTNT may refer to a secure tactical non-3GPP RAT.

User Equipment (UE). The UEs may include any suitable user device for communicating wirelessly over a RAT to the 5GC, such as, but not limited to, a cellular phone or any device equipped for a cellular network connection.

Voice over internet protocol (VoIP). VoIP may refer to voice traffic by transmission packets using the IP.

Waveform (WF). WF may refer to a non-3GPP RAT.

Wireless Local Area Network (WLAN). WLAN may refer to an IEEE 802.1 wireless network, including Wi-Fi.

WLAN Medium Access Layer (WLAN MAC). WLAN MAC may refer to the channel access layer that controls access to the WLAN PHY.

WLAN Physical Layer (WLAN PHY). WLAN PHY may refer to the modulation and demodulation of information over a WLAN.

Warrior Robust Enhanced Network (WREN). WREN may refer to a secure tactical non-3GPP RAT.

(Y1) may refer to an interface between a UE and an untrusted Wi-Fi access point over WLAN.

(Y2) may refer to an interface between an untrusted Wi-Fi access point and an N3IWF.

(Yt) may refer to an interface between a UE and a trusted Wi-Fi access point over WLAN.

(Ta) may refer to an interface between a trusted Wi-Fi access point and an TNGF.

Referring now to FIG. 1, a system 100 is described, in accordance with the prior art. The system 100 may include a user equipment (UE) accessing a 5G Core network by a "Non-3GPP Interworking Function" (N3IWF), a "Trusted Non-3GPP Gateway Function" (TNGF), or a 5G gNB, in accordance with the prior art. A user equipment (UE) 102 may also be referred to as a 5G mobile device, or a 5G UE. The UE 102 may be equipped with both a 5G Radio Access Network (RAN) interface as well as an 802.11 Wi-Fi interface. The UE 102 may utilize Wi-Fi to access the 5G Core Network 108 when both the Wi-Fi and the 5G RAN are available. The UE 102 may then use the 5G RAN for IP data when Wi-Fi is not available. The UE 102 may then use the Wi-Fi when 5G RAN is not available. For example, the UE 102 may access a 5G gNB 106c, an untrusted Wi-Fi access point (AP) 104a or a trusted Wi-Fi access point 104b via Wi-Fi. In particular, the UE 102 may communicate with the 5G core network 108 by going through a 5G gateway function 106 and through an access point 104. The 5G gateway function 106 may generally be defined by the 3GPP standards. The 5G gateway function 106 may be hosted in an access point. Similarly, the Wi-Fi access point 104 may be an access point defined by the IEEE standards. For example, the UE 102 may communicate with the 5G core network 108 by going through a 5G-standard "Non-3GPP Interworking Function" (N3IWF) 106a via the untrusted Wi-Fi Access Point 104a. By way of another example, the UE 102 may communicate with the 5G core network 108 by going through a "Trusted Non-3GPP Gateway Function" (TNGF) 106b via the trusted Wi-Fi Access Point 104b. The UE 102 may access the 5G core network by the access point whether or not the 5G interface is available with the 5G RAN. The UE may thus use a non-3GPP gateway as defined by 3GPP standards. The non-3GPP gateway may include the function 106 (e.g., the N3IWF 106a, the TNGF 106b).

Referring now to FIGS. 2A-2D, a protocol stack 200 (e.g., protocol stack 200a, protocol stack 200b, protocol stack 200c, protocol stack 200d) for the UE 102 accessing the 5G Core network 108 by N3IWF 106a or TNGF 106b is described, in accordance with the prior art. Since the UE 102 is not communicating directly with the 5G RAN and is going through additional elements to reach the 5G Core Network 108, the 5G standard imposes several additional protocol layers for security measures. Thus, the UE 102 can use the access point 104 (e.g., trusted access point 104a or untrusted access point 104b) to communicate with the 5G Core Network 108. However, the communication with the 5G Core Network 108 may incur a significant protocol overhead.

The protocol stack 200a, the protocol stack 200b, and the protocol stack 200c may be for the untrusted Wi-Fi access point 104a with the N3IWF 106a, although this is not intended to be a limitation of the present disclosure. The protocol stack 200d may be for the trusted Wi-Fi access point 104b with the TNGF 106b.

Protocol stacks for the N3IWF 106a may be similar to the TNGF 106b. For example, the protocol stacks for the trusted Wi-Fi access point 104b with the TNGF 106b may be similar. One exception is that the protocol stacks for the trusted Wi-Fi access point 104b with the TNGF 106b may not include an IKEv2 206 in FIG. 2A. Another exception is that the protocol stacks for the trusted Wi-Fi access point 104b with the TNGF 106b may utilize a null crypto for the IPSec tunnels in FIGS. 2B-2C. For the purposes of this disclosure, such differences are immaterial. In this regard, although much of the description and the drawings are directed to N3IWF 106a, this is not intended as a limitation of the present disclosure. Embodiments of the present disclosure may be similarly made to the TNGF 106b or another 3GPP Wi-Fi access point function by appropriate modification to the protocol stacks. Details of this stack may be implemented for 4G/LTE and/or future 6G with appropriate modifications. Such modifications are not material for the purposes of the present disclosure.

The protocol stacks may include one or more layers, such as, but not limited to, NAS 202, EAP-5G 204, IKEv2 206, IP 208, WLAN MAC 210, L2 212, WLAN PHY 214, L1 216, N2 Stack 218, Inner IP 222, IPSec 224 (also referred to as an IPsec tunnel), Application layer 226, GRE 228, N3 Stack 230, User IP 232, and the like. The 5G protocol may include one or more protocol layers for security measures, such as IKEv2 206, EAP-5G 204, and/or IPSec 224. The 5G protocol may also include a protocol layer for encapsulating user data, such as a GRE 228. The protocol stacks may further include one or more tunnels or interfaces, such as, but not limited to, NWu, NWt, Y1, Y2, Yt, N1, N2, N3, and the like.

Figure 2A:
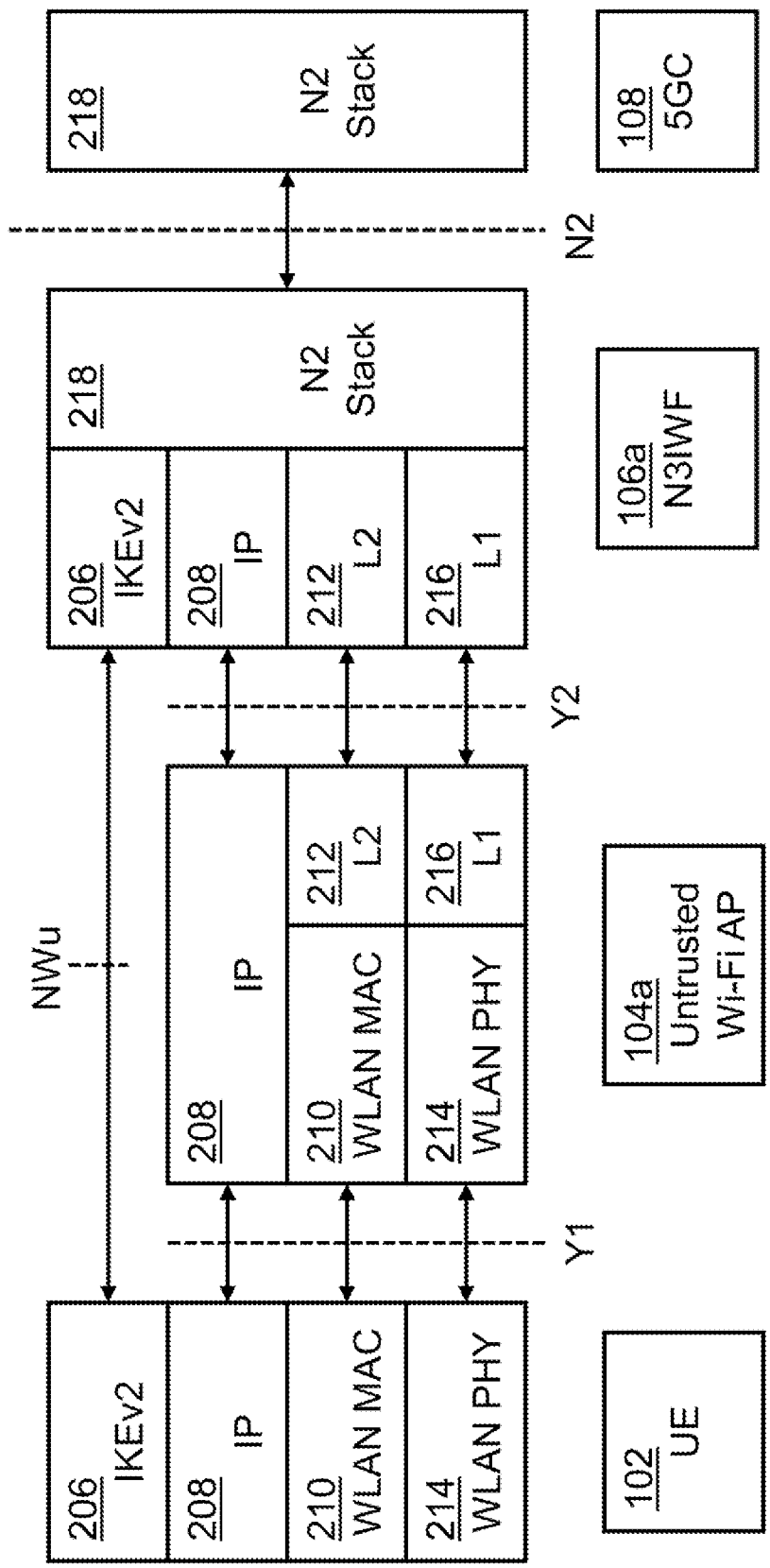
FIGS. 2A-2D depict a protocol stack, in accordance with the prior art.

FIG. 2A depicts the protocol stack 200a provided between the UE 102, the untrusted Wi-Fi Access Point 104a, the N3IWF 106a, and the 5G core network 108 for the Control Plane before security authorization. In the Control Plane, the UE 102 begins the process by establishing an IPSec security association (SA) with the N3IWF 106a and creating a tunnel (NWu) that is carried across the untrusted Wi-Fi Access Point 104a. The protocol stack 200a may also be referred to as a N3IWF control plane before security authentication establishment.

Figure 2B:
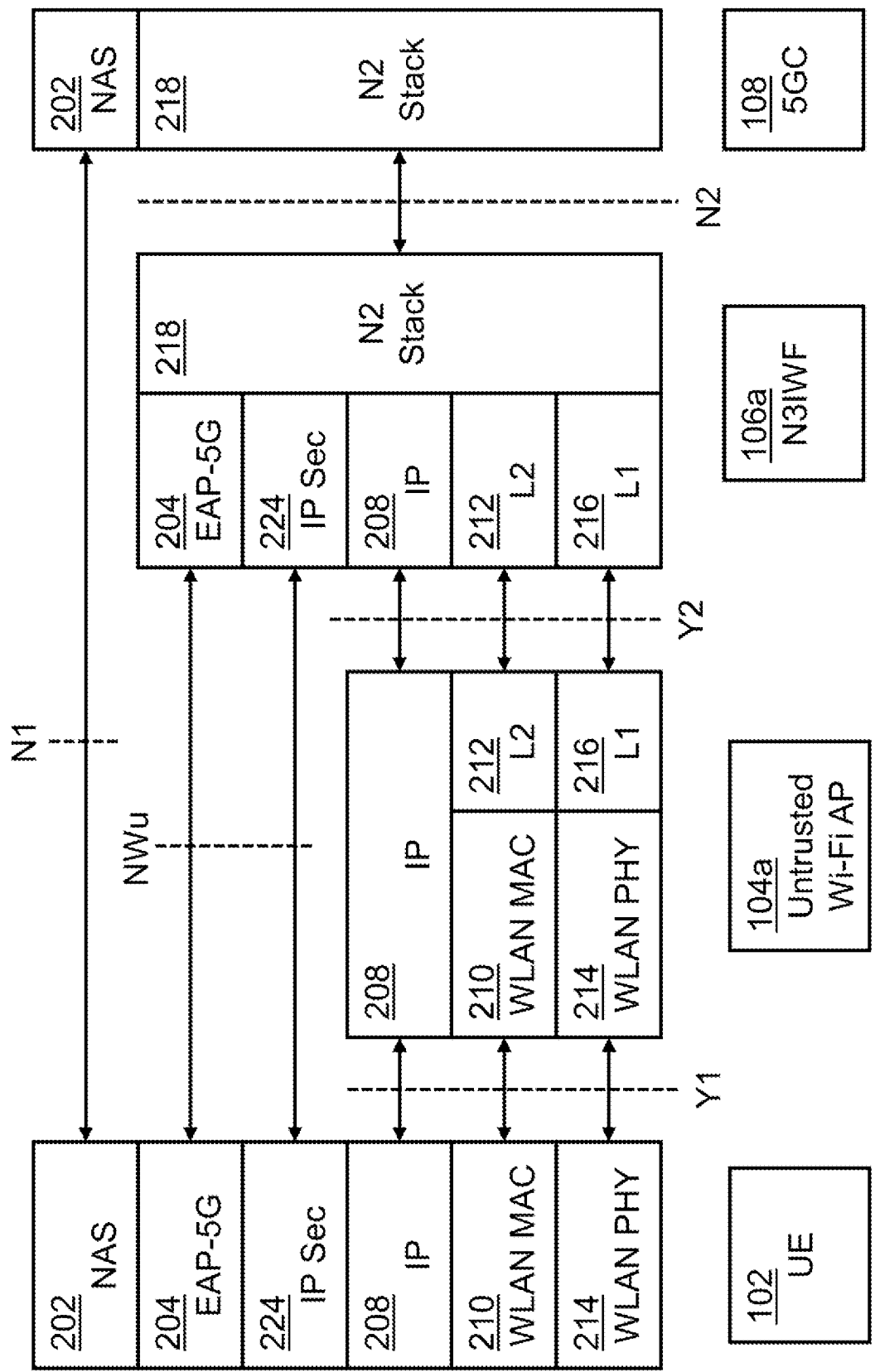

FIG. 2B further depicts the protocol stack 200b provided between the UE 102, the untrusted Wi-Fi Access Point 104a, the N3IWF 106a, and the 5G core network 108 for the Control Plane after security authorization. Once the IPSec tunnel (NWu) is established, all Control Plane signaling is carried through it for the duration of the session, along with several layers of additional protocol headers (IP, IPSec) to securely carry the control traffic across the Access Point. The protocol stack 200b may also be referred to as a N3IWF control plane after security authentication establishment.

Figure 2C:
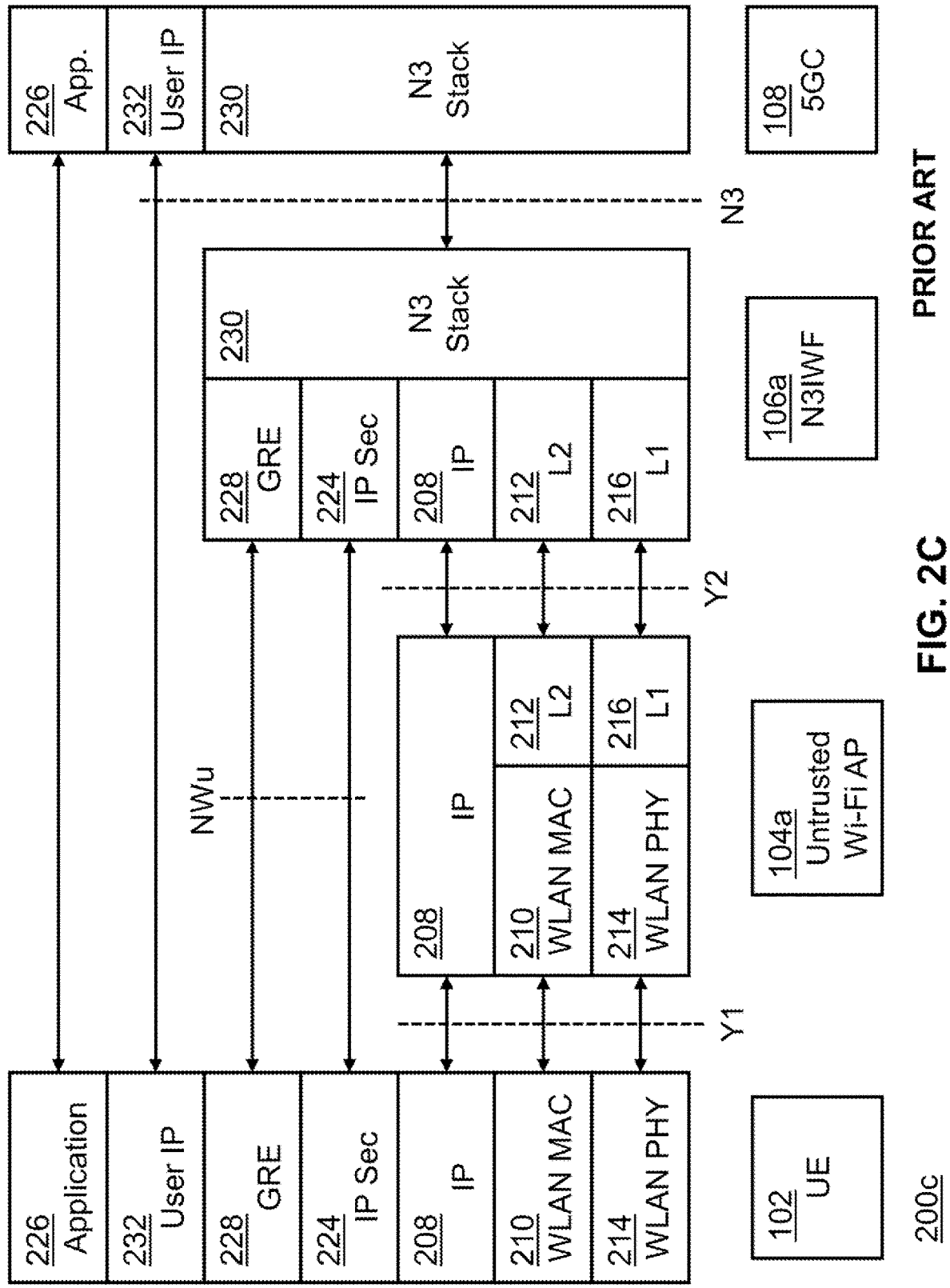

FIG. 2C further depicts the protocol stack 200c provided between the UE 102, the untrusted Wi-Fi Access Point 104a, the N3IWF 106a, and the 5G core network 108 for the User Plane. The UE 102 then establishes another IPSec Security association (SA) to carry the actual user data. As depicted, in the User Plane, the data traffic is wrapped in multiple secure protocol headers for transport across the Access Point. This user data is carried for the duration of the session, and so takes considerably more bandwidth over the air than the Control Plane traffic. The protocol stack 200c may also be referred to as a N3IWF user plane after security authentication establishment.

Figure 2D:
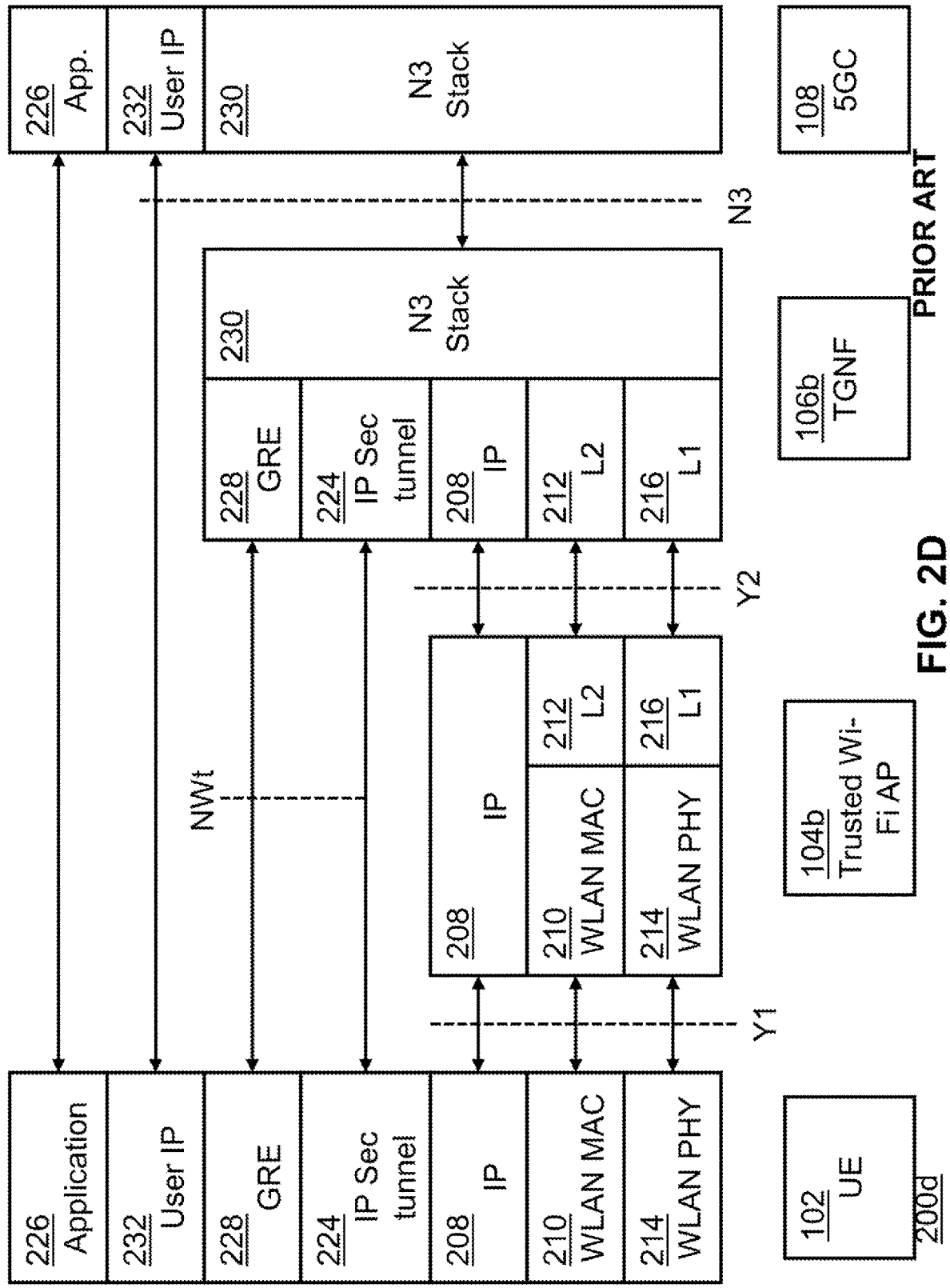

FIG. 2D further depicts the protocol stack 200d provided between the UE 102, the trusted Wi-Fi Access Point 104b, the TNGF 106b, and the 5G core network 108 for the User Plane. As depicted, in the User Plane, the data traffic is wrapped in multiple secure protocol headers for transport across the Access Point. This user data is carried for the duration of the session, and so takes considerably more bandwidth over the air than the Control Plane traffic. The protocol stack 200d may also be referred to as a TGNF user plane.

Referring generally to FIGS. 3-8B, a communication system is described, in accordance with one or more embodiments of the present disclosure. The communication system may replace the trusted or untrusted Access Point with a tactical waveform. The tactical waveform may provide secure IP service and authentication security. The tactical waveform may also reduce the over-the-air 5G overhead without sacrificing secure communication. For example, a tactical radio may host a secure IP radio service so that additional IPsec is not required.

Figure 3:
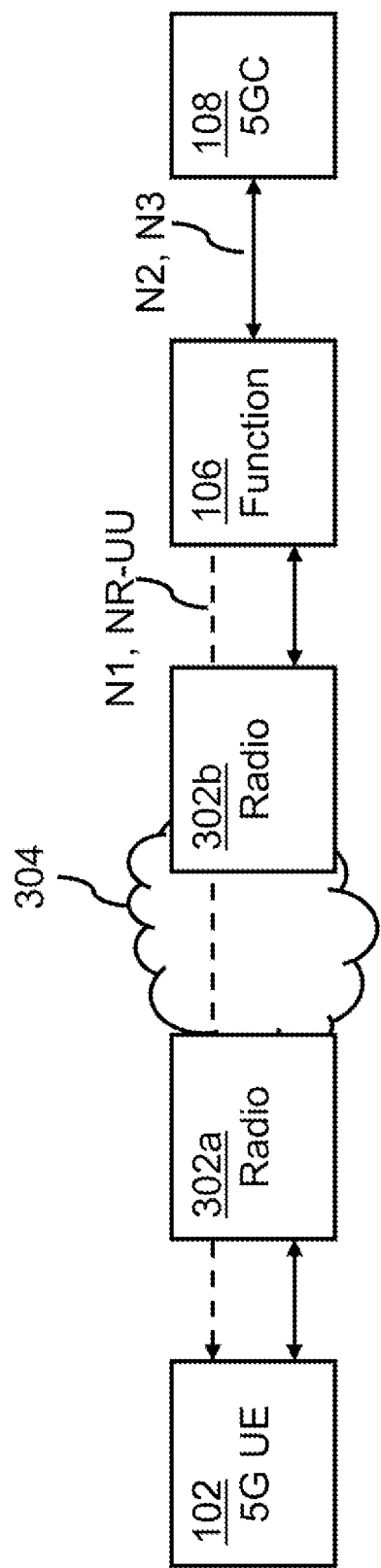
FIGS. 3-5 depict a simplified block diagram of a system, in accordance with one or more embodiments of the present disclosure.

Referring now to FIG. 3, a system 300 is described, in accordance with one or more embodiments of the present disclosure. The system 300 may depict the UE 102 connecting to the 5G core network 108 by way of one or more radios 302, a secure non-3GPP waveform 304, and the function 106. In particular, the radios 302 and the secure non-3GPP waveform 304 may replace a functionality of the Wi-Fi access point 104. The system 300 may include a non-3GPP gateway (not depicted) as defined by 3GPP standards configured to implement the function 106. The UE 102 may be configured to generate a message. The UE 102 may be communicatively coupled to the radio 302 for transmitting the message over the secured tactical waveform 304.

The radio 302 may include any non-3GPP radio, such as, but not limited to, a manpack, a handheld radio, a vehicular radio, or an airborne radio. As may be understood, any combination of single, two-channel, multi-channel tactical radios can be used to create network topologies that are mission specific. The radios may include any number of software-defined radio (SDR) capable of hosting waveforms which are transmitted or received according to the waveform protocol. The radios may be tactical radios that are capable of hosting secure tactical waveforms. As may be understood, such SDRs may include a number of components, permutations, and arrangements, which are not set forth herein for clarity. For example, SDRs may include, but are not limited to, an army navy AN/ARC-210 radio or an AN/PRC 162 radio. The SDRs may also include memory and processors by which to implement any of the functions described herein, such as, but not limited to, proxying messages to reduce overhead.

Similarly, the secure non-3GPP waveform 304 may include any protocol which is resistant to physical layer denial. Many such non-3GPP waveforms which provide secure IP networking are available to the Department of Defense (DoD). For example, the secure non-3GPP waveform 304 may include any waveform protocols selected from the DoD inventory (2022), such as, but not limited to, CDL, BE-CDL, Warrior Robust Enhanced Network (WREN), Link 16, Tactical Targeting Network Topology (TTNT), Multifunction Advanced Data Link (MADL), Intra-Flight Data Link (IFDL), Wideband Networking Waveform (WNW), Soldier Radio Waveform (SRW), and the like. Although the secure non-3GPP waveform 304 is described in the context of the DoD inventory, this is not intended as a limitation of the present disclosure. For example, the waveform may be a TSM waveform provided by Trellisware™, and the like. The secure non-3GPP waveform 304 may include one or more security functions which are not defined in the 3GPP, such that the security functions of the secure non-3GPP waveform 304 may be considered non-3GPP security functions.

One use case for the system 300 may include for establishing communication in a 5G or Wi-Fi denied area. The 5G UE may connect to the radio 302a which may then connect to the radio 302b. The 5G UE may then be connected to the 5G core network, even if the UE is not within range of the 5G core network and if Wi-Fi is denied.

Figure 4:
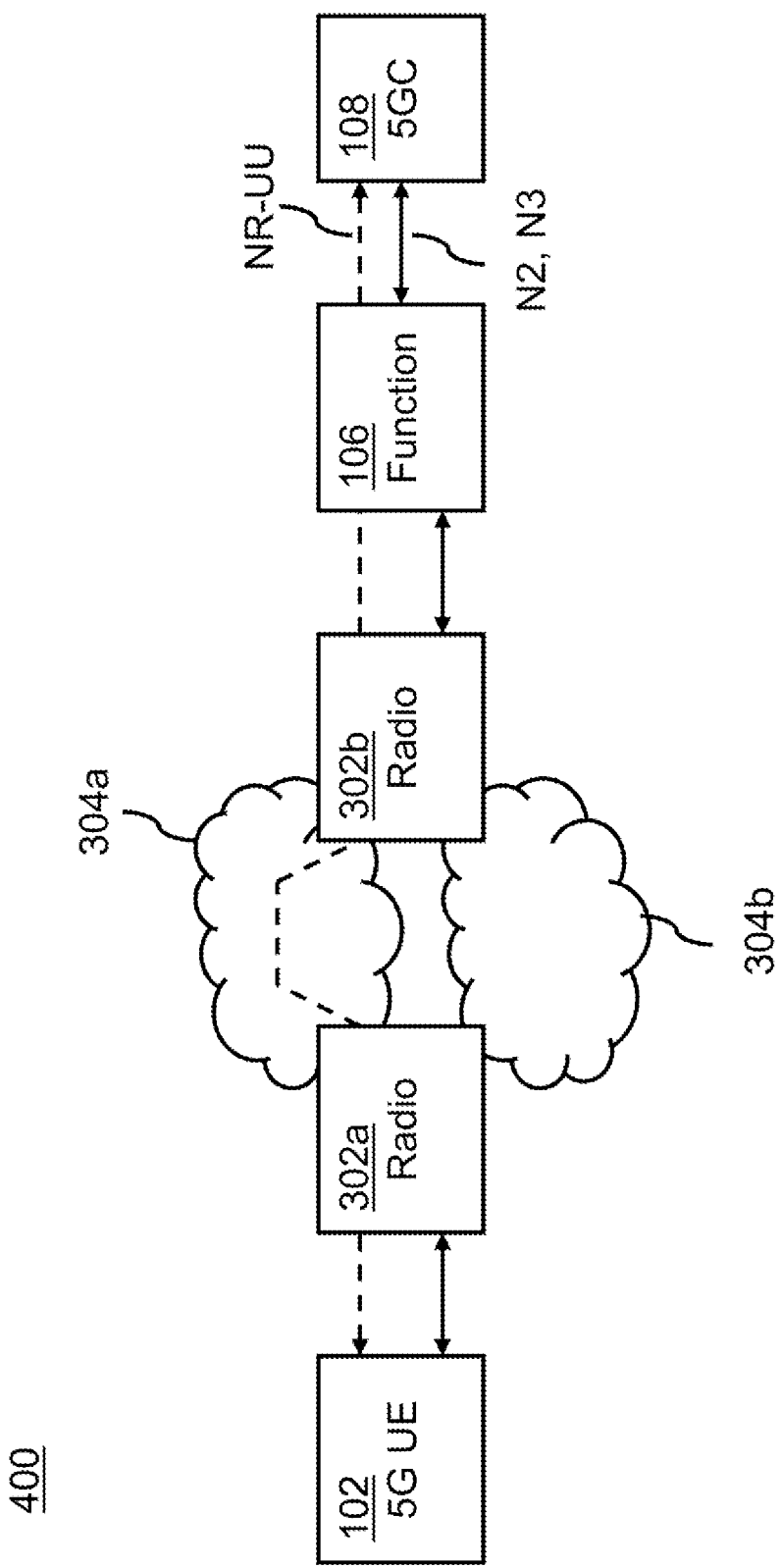

Referring now to FIG. 4, a system 400 is described, in accordance with one or more embodiments of the present disclosure. The system 400 may depict the UE 102 connecting to the 5G core network 108 by way of the one or more radios 302, where the radios 302 are multi-channel radios. The UE 102 can connect to a multi-channel radio. The multi-channel radio may then use whichever secure non-3GPP waveform (e.g., waveform 304a, waveform 304b, etc.) is most appropriate for its operational environment. For example, the radio 302 may select the secure non-3GPP waveform to improve resilience, throughput, latency, and the like.

Figure 5:
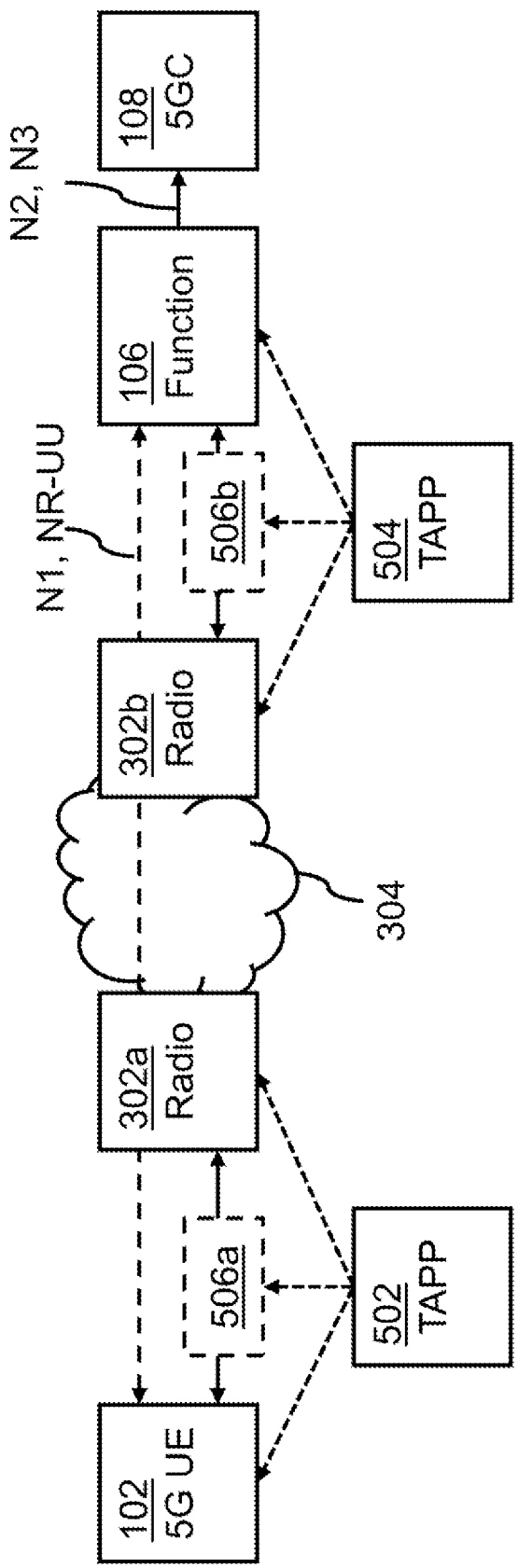

Referring now to FIG. 5, a system 500 is described, in accordance with one or more embodiments of the present disclosure. The system 500 may depict the UE 102 connecting to the 5G core network 108 by way of the one or more radios 302, the secure non-3GPP waveform 304, and the function 106. The system 500 may further include a Tactical Access Point Proxy (TAPP) 502 and a TAPP 504. The TAPP 502 and the TAPP 504 may generally include software executable functions which modify one or more layers of the protocol stack. The TAPP 502 and the TAPP 504 may expand the interface availability of the 5G UE 102 from using Wi-Fi to reach the function 106 (e.g., N3IWF 106a, TNGF 106b) via an Access Point, to further include accessing the function 106 by Wi-Fi, or through other means such as Ethernet to the radios 302.

To implement the features described in regards to FIGS. 3-4, both the 5G UE 102 and the function 106 (e.g., N3IWF or TNGF) need to interface with the secure non-3GPP waveform. The TAPP 502 and the TAPP 504 may be provided to achieve the interface with the secure non-3GPP waveform. The TAPP 502 and the TAPP 504 may be considered endpoints for proxying protocol stacks, as will be described further herein. Proxying the 3GPP security function into the non-3GPP security function may refer to either removing a layer and/or compressing a layer. Similarly, proxying the non-3GPP security function into the 3GPP security function may refer to either adding a layer or decompressing a layer. For example, the UE 102 may generate a packet. The packet may include one or more layers or extra protocol headers on top of a protocol header for connecting to the non-3GPP access point 104. The protocol headers for connecting to the non-3GPP access point 104 may be defined according to according to 3GPP standards. The secure non-3GPP waveform 304 doesn't need the extra protocol headers and removes the headers. The headers may also be referred to as a 3GPP security function. The headers may be removed by the TAPP 502. Removing the headers may be referred to as proxying a 3GPP security function into a non-3GPP security function. The radio 302a sends the packet as is with the removed headers. On the other end of the secure non-3GPP waveform 304, the TAPP 504 receives a message which tells the TAPP 504 how to rebuild the headers which were previously removed. The TAPP 504 adds the protocol layers in response to receiving the message over the network, thereby rebuilding the message packet. Rebuilding the packet with the headers may be referred to as proxying the non-3GPP security function into the 3GPP security function. The rebuilt packet may look like the message with the headers sent by the UE 102. The rebuilt packet may then be provided to the function 106 for accessing the 5G core network 108. The rebuilt packet may prevent the function 106 and/or the 5G core network 108 from knowing the packet headers have been removed and then rebuilt.

A number of possible locations are contemplated for the TAPP 502 and the TAPP 504. The TAPP 502 and the TAPP 504 are conceptually a "bump in the wire" providing flexible options regarding where to locate the functionality. For example, possible instantiations for the TAPP 502 include as software, firmware, or hardware in the UE 102, as a TAPP hardware element 506a between the UE 102 and the radio 302a, and/or as software, firmware, or hardware in the radio 302a. By way of another example, possible instantiations for the TAPP 504 include as a software, firmware, or hardware in the radio 302b, as a TAPP hardware element 506b between the radio 302b and the function 106, and/or as a software, firmware, or hardware in the function 106.

In embodiments, the system 500 may include one or more of the TAPP hardware elements 506, such as the TAPP hardware element 506a and/or the TAPP hardware element 506b. The TAPP hardware element 506a may or may not be communicatively coupled between the UE 102 and the radio 302a. Communicatively coupled between may refer to a bump-in-the wire concept of coupling a device between two devices. The TAPP hardware element 506a may be coupled to each of the devices for communication purposes. The TAPP hardware element 506a may intercept the message between the UE 102 and the radio 302a and proxy the 3GPP security function into the non-3GPP security function. In embodiments, the TAPP hardware element 506a may be optional depending upon the location of the TAPP 502. The TAPP hardware element 506b may or may not be communicatively coupled between the radio 302b and the function 106. The TAPP hardware element 506b may intercept the message between the radio 302b and the function 106 (e.g., the access point) and proxy the non-3GPP security function into the 3GPP security function. The TAPP hardware element 506b may be optional depending upon the location of the TAPP 504.

It is contemplated that the system 500 may include nine possible permutations of the TAPP 502 and the TAPP 504. In a first permutation, the 5G UE 102 includes the TAPP 502 and the radio 302b includes the TAPP 504. In a second permutation, the 5G UE 102 includes the TAPP 502 and the TAPP hardware element 506b includes the TAPP 504. In a third permutation, the 5G UE 102 includes the TAPP 502 and the function 106 includes the TAPP 504. In a fourth permutation, the TAPP hardware element 506a includes the TAPP 502 and the radio 302b includes the TAPP 504. In a fifth permutation, the TAPP hardware element 506a includes the TAPP 502 and the TAPP hardware element 506b includes the TAPP 504. In a sixth permutation, the TAPP hardware element 506a includes the TAPP 502 and the function 106 includes the TAPP 504. In a seventh permutation, the radio 302a includes the TAPP 502 and the radio 302b includes the TAPP 504. In an eighth permutation, the radio 302a includes the TAPP 502 and the TAPP hardware element 506b includes the TAPP 504. In a ninth permutation, the radio 302a includes the TAPP 502 and the function 106 includes the TAPP 504.

A protocol stack 600 (e.g., protocol stack 600a, protocol stack 600b, protocol stack 600c, and protocol stack 600d) may depict the permutation where the radio 302a includes the TAPP 502 and the radio 302b includes the TAPP 504. Similarly, a protocol stack 900 (e.g., protocol stack 900a, protocol stack 900b) may depict the permutation where the radio 302a includes the TAPP 502 and the radio 302b includes the TAPP 504 for voice communications.

A protocol stack 700 (e.g., protocol stack 700a, protocol stack 700b, protocol stack 700c, protocol stack 700d) may depict the permutation where the UE 102 includes the TAPP 502 and the function 106 includes the TAPP 504. Similarly, a protocol stack 1000 (e.g., protocol stack 1000a, protocol stack 1000b) may depict the permutation where the UE includes the TAPP 502 and the function 106 includes the TAPP 504 for voice communications.

A protocol stack 800 (e.g., protocol stack 800a, protocol stack 800b, protocol stack 800c, protocol stack 800d) may depict the permutation where the TAPP hardware element 506a includes the TAPP 502 and the TAPP hardware element 506b includes the TAPP 504. Similarly, a protocol stack 1100 (e.g., protocol stack 1100a, protocol stack 1100b) may depict the permutation where the TAPP hardware element 506a includes the TAPP 502 and the TAPP hardware element 506b includes the TAPP 504 for voice communications.

Thus, three of the nine permutations are depicted. The various protocol stacks for all of the nine permutations are not expressly depicted in the interest of brevity. Modifications may be made to one or more protocol stack 600, protocol stack 700, protocol stack 800, protocol stack 900, protocol stack 1000, and/or protocol stack 1100 to achieve any of the nine permutations. For example, the UE 102 including the TAPP 502 of the protocol stack 700 may be modified with the radio 302b including the TAPP 504 of the protocol stack 600 to achieve the first permutation. By way of another example, the UE 102 including the TAPP 502 of the protocol stack 700 may be modified with the TAPP hardware element 506b including the TAPP 504 of the protocol stack 800 to achieve the second permutation. By way of another example, the third permutation is depicted. By way of another example, the TAPP hardware element 506a including the 502 of the protocol stack 800 may be modified with the radio 302b including the TAPP 504 of the protocol stack 600 to achieve the fourth permutation. By way of another example, the fifth permutation is depicted. By way of another example, the TAPP hardware element 506a including the TAPP 502 of the protocol stack 800 may be modified with the function 106 including the TAPP 504 of the protocol stack 700 to achieve the sixth permutation. By way of another example, the seventh permutation is depicted. By way of another example, the radio 302a including the TAPP 502 of the protocol stack 600 may be modified with the TAPP hardware element 506b including the TAPP 504 of the protocol stack 800 to achieve the eighth permutation. By way of another example, the radio 302a including the TAPP 502 of the protocol stack 600 may be modified with the with the function 106 including the TAPP 504 of the protocol stack 700 to achieve the ninth permutation.

The TAPP 502 may proxy messages from the UE 102 over the secure non-3GPP waveform 304 to the TAPP 504. The TAPP 502 may proxy the messages by sending messages as-is to the TAPP 504. Alternatively, the TAPP 502 may proxy the messages by using customized messages which are optimized to reduce over-the-air bandwidth. For example, the UE 102 may terminate the Control Plane interface from the 5G Core Network 108, as well as the User Plane traffic, but the signaling is proxied by the TAPP 502 and the TAPP 504. The proxying allows for greatly reduced message sizes over the air. Proxying is discussed in more detail later in this disclosure. By the TAPP 502 and the TAPP 504, the UE 102 expects that communication is made directly with the function 106. Similarly, the function 106 expects that communication is made directly with the UE 102. Because the secure non-3GPP waveform already includes a secure IP service, there is no need for the IPSec protocol between the UE 102 and the function. Instead, the secure IP service provided by the secure non-3GPP waveform 304 may be used. Using the secure IP service by the waveform 304 may resulting in significant bandwidth reduction over the air, after removing the associated headers from the IPSec protocol. The TAPP 502 may be configured to proxy the IP layer 208 into a waveform IP 208a layer. The TAPP 504 may also be configured to rebuild the message. For example, the TAPP 504 may be configured to proxy the waveform IP 208a layer into the IP layer 208.

In standard 5G, the UE creates an IPSec security association by interacting with the function 106 and/or elements in the 5G Core Network 108. The UE may create the IPSec security association for registration, authentication, and authorization of the UE. All Control Plane signaling may be carried through this IPSec tunnel between the UE and the N3IWF once the security association is created. An additional Security association (SA) may be created exclusively for User Plane traffic. Therefore, some traffic between the TAPP 502 and the TAPP 504 may be used to coordinate the IPSec tunnels on either end, and to communicate with the 5G Core Network 108 during the initial authentication and authorization procedures.

In the User Plane, some messaging may be necessary between the TAPP 502 and the TAPP 504. For example, the messaging may be needed to maintain coordination of the traffic sessions. However, the overhead of the messaging may be minimal compared to the protocol messaging. The user data may be the bulk of the traffic sent between the UE 102 and 5G core network 108. Thus, there are several possible instantiations of the TAPP messaging. All instances may include proxying one or more protocol layers from the user plane. Proxying the protocol layers from the user plane may be one instance of proxying a third-generation partnership project (3GPP) security function into a non-3GPP security function. Proxying the various user plane layers prior to transmission across the secure waveform 304 may be particularly advantageous in saving overhead in the user plane, thereby saving over-the-air bandwidth. It is contemplated that the TAPP messages 602 in the user plane may be on the order of ten times fewer bytes of overhead per packet than the protocol layers forming the user plane (e.g., the User IP 232, the GRE 228, the inner IP 222, and/or the IPSec 224 layers). The TAPP message 602 may thus provide a significant improvement for user data. For instance, narrowband frequency hopping networks may have a total throughput of about 5 kilobits a second and supports about 100 nodes in the network. Including the packet headers of the user plane with the application layer 226, the User IP 232, the GRE, Inner IP, and/or the IPSec may limit the number of operational nodes on the network to around two nodes. Reducing the overhead of the user plane may allow significantly more nodes on the network.

In embodiments, all Control Plane traffic may be sent as-is (e.g., FIG. 2A, 2B), and proxy messages may be used to coordinate User Plane traffic handling (e.g., FIGS. 6C, 6D, 7C, 7D, 8C, 8D). In the first instance, the TAPP 502 may proxy one or more layers of the Control Plane traffic into a TAPP message (e.g., TAPP message 602. For example, one or more of the User IP 232, the GRE 228, the Inner IP 222, and/or the IPSec 224 layers may be proxied into the TAPP message 602. Any of the various layers may be considered a 3GPP security function and the TAPP message 602 may be considered a non-3GPP security function. The TAPP 504 may then receive the TAPP message 602 and rebuild the message into a format compatible with the function 106. The TAPP 504 may add one or more layers back to the message in response to receiving the TAPP message 602. For example, one or more of the User IP 232, the GRE 228, the Inner IP 222, and/or the IPSec 224 layers may be added back to the message. The user plane traffic may then be connected to the 5GC 108 realizing the user plane traffic was routed through a proxy network.

In embodiments, control plane traffic is sent as-is before the initial Security association (SA) is created (e.g., FIG. 2A), then proxy messages may be used to coordinate Control Plane traffic handling before the security association (e.g., FIGS. 6A, FIG. 7A, FIG. 8A), to coordinate Control Plane traffic handling after the security association (e.g., FIGS. 6B, FIG. 7B, FIG. 8B) and also to coordinate the User Plane traffic handling (e.g., FIGS. 6C, 6D, 7C, 7D, 8C, 8D). The TAPP 502 may include proxying one or more layers of the control plane traffic before the security association into the TAPP message 602. For example, the IKEv2 206 and IP 208 layers may be proxied into the TAPP message 602. Any of the various layers may be considered a 3GPP security function and the TAPP message 602 may be considered a non-3GPP security function. The TAPP 504 may also proxy one or more layers of the control plane traffic after the security association. The TAPP 504 may add one or protocol layers of the control plane traffic in response to receiving the TAPP message 602. For example, IKEv2 206 and IP 208 layers may be proxied from the TAPP message 602. The TAPP 502 may include proxying one or more layers of the control plane traffic after the security association into the TAPP message 602. For example, the EAP-5G 204, the IP 208, and/or the IPSec 224 layers may be proxied into the TAPP message 602. Any of the various layers may be considered a 3GPP security function and the TAPP message 602 may be considered a non-3GPP security function. The TAPP 504 may also proxy one or more layers of the control plane traffic after the security association. The TAPP 504 may add one or protocol layers of the control plane traffic in response to receiving the TAPP message 602. For example, the EAP-5G 204, the IP 208, and/or the IPSec 224 layers may be proxied from the TAPP message 602. The TAPP 502 and the TAPP 504 may handle the User Plane traffic as previously described.

In embodiments, proxy messages may be used to proxy Control Plane traffic handling before the security association (e.g., FIGS. 6A, 7A, 8A), coordinate Control Plane traffic handling after the security association (e.g., FIGS. 6B, FIG. 7B, FIG. 8B), and the User Plane traffic handling (e.g., FIGS. 6C, 6D, 7C, 7D, 8C, 8D). The TAPP 502 may proxy one or more layers of the control plane traffic before the security association into the TAPP message 602. For example, the IKEv2 206 layers may be proxied into a TAPP message 602. Any of the various layers may be considered a 3GPP security function and the TAPP message 602 may be considered a non-3GPP security function. The TAPP 504 may also proxy one or more layers of the control plane traffic before the security association. The TAPP 504 may add one or more protocol layers of the control plane traffic in response to receiving the TAPP message 602. For example, the IKEv2 206 layers may be proxied from the TAPP message 602. Furthermore, where the function 106 is the N3IWF 106a, the IKEv2 206 layer may be proxied. Where the function 106 is the TNGF 106b, there may be no IKEv2 206 layer to be proxied. The identical principles thus apply to other types of the function 106, such as TNGF 106b, with appropriate proxying of the layers. The TAPP 502 and the TAPP 504 may handle the control plane traffic after the security association and the User Plane traffic as previously described.

As may be understood, proxying the control plane traffic handling before and/or after the security association is not intended to be limiting. In this regard, the various layers used for the control plane traffic handling may take up relatively low overhead compared to layers in the user plane. Thus, proxying the control plane traffic may or may result in significant overhead savings over the secure non-3GPP waveform 304. In all cases, the TAPP 502 and the TAPP 504 proxies any User Plane coordination messages. Proxying the User Plane coordination messages may be beneficial since the user traffic itself no longer includes the GRE 228 and IPSec 224 overhead prior to being injected into the secure non-3GPP waveform 304.

As may be understood, the descriptions and depictions of the TAPP 502 and the TAPP 504 are not intended to be limiting. Bidirectional communication may be established between the UE 102 and the 5G core network 108 by the TAPP 502 and the TAPP 504. In this regard, the TAPP 502 may be used to reduce the overhead when communicating from the UE 102 to the 5G core network 108, with the TAPP 504 then rebuilding the communication package. Similarly, the TAPP 504 may be used to reduce the overhead when communicating from the 5G core network 108 to the UE 102, with the TAPP 502 then rebuilding the communication package. For example, the various functions of the TAPP 502 (e.g., proxying the 3GPP security function into the non-3GPP security function) may be implemented by the TAPP 504 when communicating from the 5G core network 108 to the UE 102. Similarly, the various functions of the TAPP 504 (e.g., proxying the non-3GPP security function into the 3GPP security function) may be implemented by the TAPP 502 when communicating from the 5G core network 108 to the UE 102. Thus, although much of the present disclosure is directed to how proxying is implemented for directional communication from the UE 102 to the 5G core network, this is not intended as a limitation of the present disclosure. Bidirectional communication may be established by the TAPP 502 both proxying the 3GPP security function into the non-3GPP security function when transmitting messages (e.g., a first message) to the 5G core network 108 and proxying the non-3GPP security function into the 3GPP security function when receiving messages (e.g., a second message) from the 5G core network 108. Similarly, bidirectional communication may be established by the TAPP 504 both proxying the non-3GPP security function into the 3GPP security function when receiving messages (e.g., a first message) from the UE 102 and proxying the 3GPP security function into the non-3GPP security function when transmitting messages (e.g., a second message) to the UE 102.

In embodiments, the proxying functions of the TAPP 502 may be different than the proxying functions of the TAPP 504. The TAPP 502 may proxy the 3GPP security function into the non-3GPP security function and/or the non-3GPP security function into the 3GPP security function non-symmetrically with the TAPP 504. Non-symmetric proxying may refer to the TAPP 502 removing or rebuilding the packet differently than the TAPP 504 depending upon which direction communication is occurring between the UE 102 and the 5G core network 108. Note that TAPP messaging is not always symmetric. Some proxy messages may only flow towards the gateway (e.g., function 106). Similarly, some proxy messages may only flow toward the UE 102. For example, the TAPP 502 may be non-symmetric to the TAPP 504 when establishing an initial security association between the UE 102 and the function 106, although this is not intended to be limiting. For instance, the UE 102 may initiate the IPSec tunnel establishment using EAP over IKEv2, while the function 106 (e.g., N3IWF 106a or TNGF 106b) may respond to the request to establish these tunnels. Thus, the TAPP 502 may be a different instantiation than the TAPP 504.

Referring now to FIGS. 6A-6D, a protocol stack 600 (e.g., protocol stack 600a, protocol stack 600b, protocol stack 600c, protocol stack 600d) is described including a TAPP, in accordance with one or more embodiments of the present disclosure. The protocol stack 600 may depict the UE 102 connecting to the 5G core network 108 by way of the radios 302, the secure non-3GPP waveform 304, the TAPP 502, the TAPP 504, and the function 106.

Figure 6A:
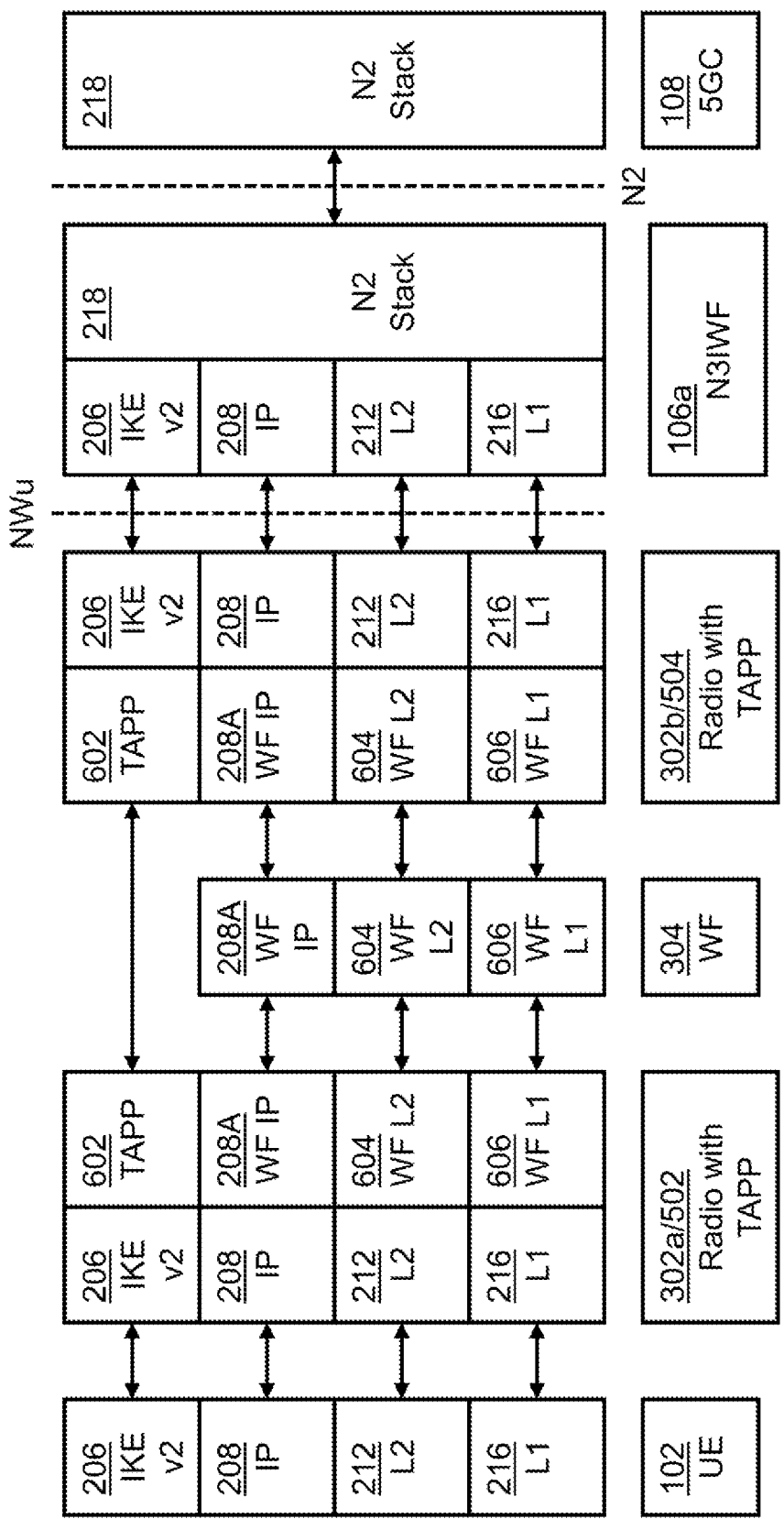
FIG. 6A depicts a protocol stack of a control plane before establishing a security association with a N3IWF, and depicts two radios each including a TAPP, in accordance with one or more embodiments of the present disclosure.

FIG. 6A depicts the protocol stack 600a for the Control Plane prior to establishing an IPSec Security Association. The radio 302a may include the TAPP 502. Optionally, one or more layers of the protocol stack of a message received from the UE 102 may be proxied and removed by the TAPP 502. The radio 302b may include the TAPP 504. The TAPP 504 may receive the TAPP message 602 and add one or more layers (e.g., the IKEv2 206 layers) prior to transmission to the N3IWF 106a.

Figure 6B:
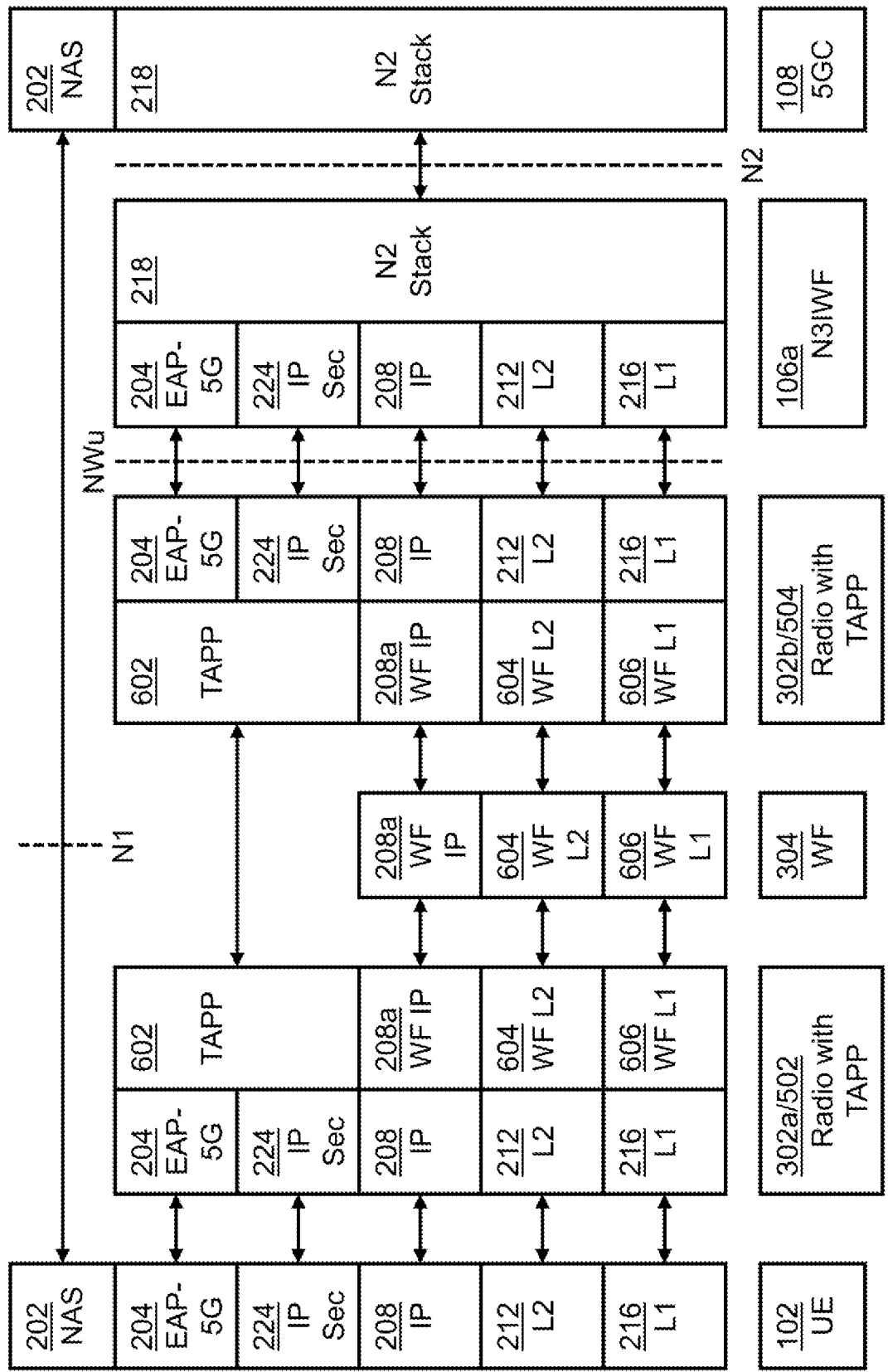
FIG. 6B depicts a protocol stack of a control plane after establishing a security association with a N3IWF, and depicts two radios each including a TAPP, in accordance with one or more embodiments of the present disclosure.

FIG. 6B depicts the protocol stack 600b for the Control Plane after establishing the security association. The radio 302a may include the TAPP 502. Optionally, one or more layers of the protocol stack of a message received from the UE 102 may be proxied and removed by the TAPP 502. The radio 302b may include the TAPP 504. The TAPP 504 may receive the TAPP message 602 and one or more layers prior to transmission to the function 106. As may be understood, this figure is not intended to be limiting. In this regard, such layers may take up relatively low overhead compared to layers in the user plane.

Figure 6C:
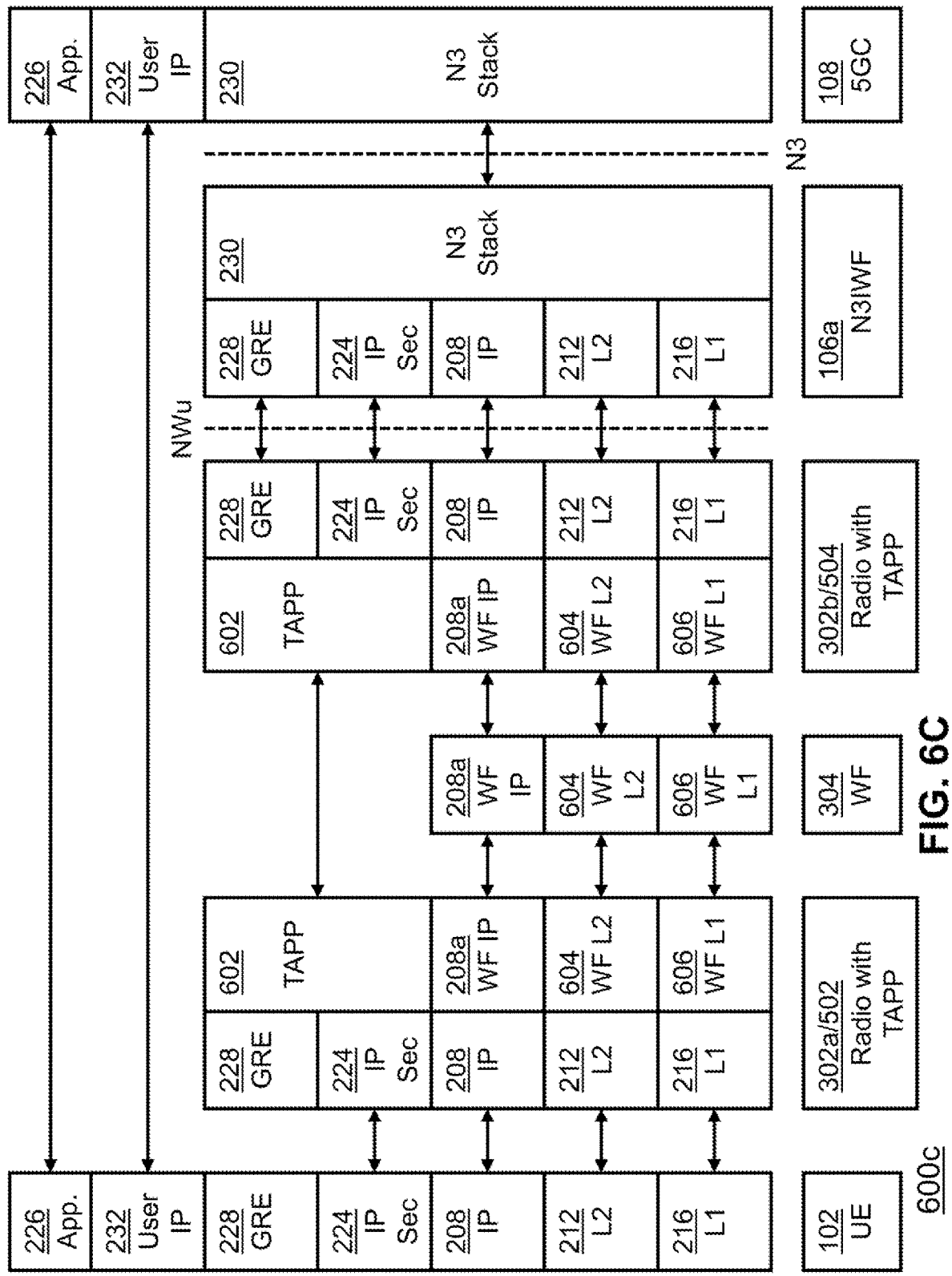
FIG. 6C depicts a protocol stack of a user plane after establishing a security association with a N3IWF, and depicts two radios each including a TAPP, in accordance with one or more embodiments of the present disclosure.

FIG. 6C depicts the protocol stack 600c for the User Plane after establishing the security association. The radio 302a may include the TAPP 502. One or more layers of the protocol stack of a message received from the UE 102 may be proxied and removed by the TAPP 502. The radio 302b may include the TAPP 504. The TAPP 504 may receive the TAPP message 602 and rebuild the message prior to transmission to the function 106.

Figure 6D:
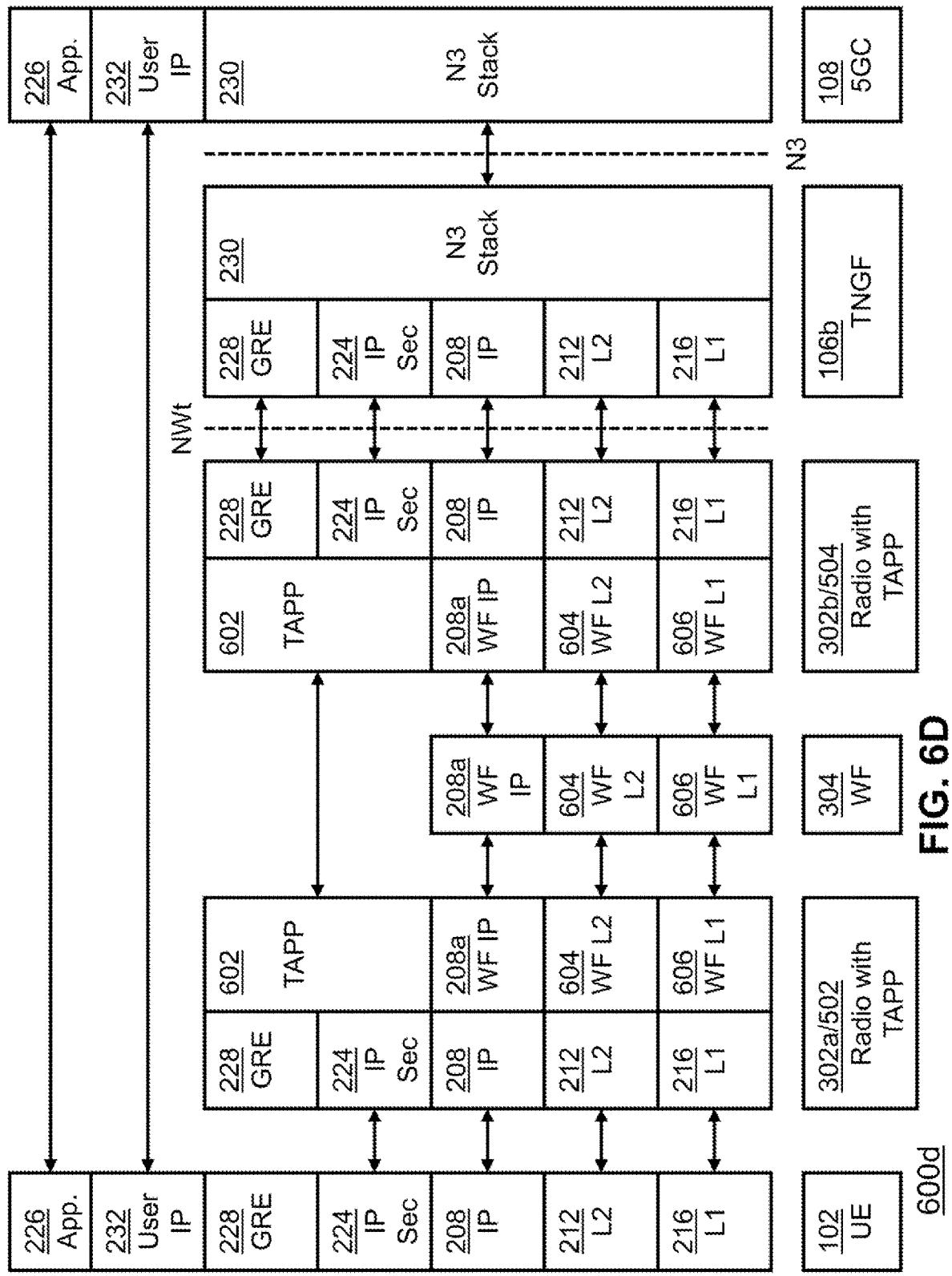
FIG. 6D depicts a protocol stack of a user plane with a TNGF, and depicts two radios each including a TAPP, in accordance with one or more embodiments of the present disclosure.

FIG. 6D depicts the protocol stack 600d for the User Plane with the function 106 being the TNGF 106b. The protocol stack 600d may be similar to the protocol stack 600c with the exception that the protocol stack 600d includes an NWt interface instead of a NWu interface.

Referring now to FIGS. 7A-7D, a protocol stack 700 (e.g., protocol stack 700a, protocol stack 700b, protocol stack 700c, protocol stack 700d) is described, in accordance with one or more embodiments of the present disclosure. The UE 102 may include the TAPP 502. In some instances, the UE 102 may be configured to communicate with the radio 302b directly by the secure non-3GPP waveform 304 or may communicate with the radio 302b by the radio 302a and the secure non-3GPP waveform 304. The radio 302b may then communicate with the function 106. The function 106 may include the TAPP 504 for rebuilding the message. Thus, the UE 102 may connect to the 5G core network 108 by way of the radios 302, the secure non-3GPP waveform 304, the TAPP 502, the TAPP 504, and the function 106.

A protocol stack where the UE 102 includes the TAPP 502 is now described. The 5G stack within the UE may be left unmodified where the TAPP 502 functionality is embedded within the UE 102. The TAPP 502 may intercept all messages generated by the security protocols and then proxy those messages across the Secure Tactical Network. In another possible instantiation, the 5G stack within the UE 102 is modified to remove the IP security protocols entirely, and the TAPP 502 generates the necessary proxy messages to send over the secure tactical network. The protocol stack 700 may or may not include the UE 102 which has been modified with a reduced stack including one or more null one or more layers. The UE 102 may also be referred to as a modified UE, a modified 3GPP UE with a reduced stack, or a non-3GPP IP UE. The UE 102 may include the TAPP 502.

Figure 7A:
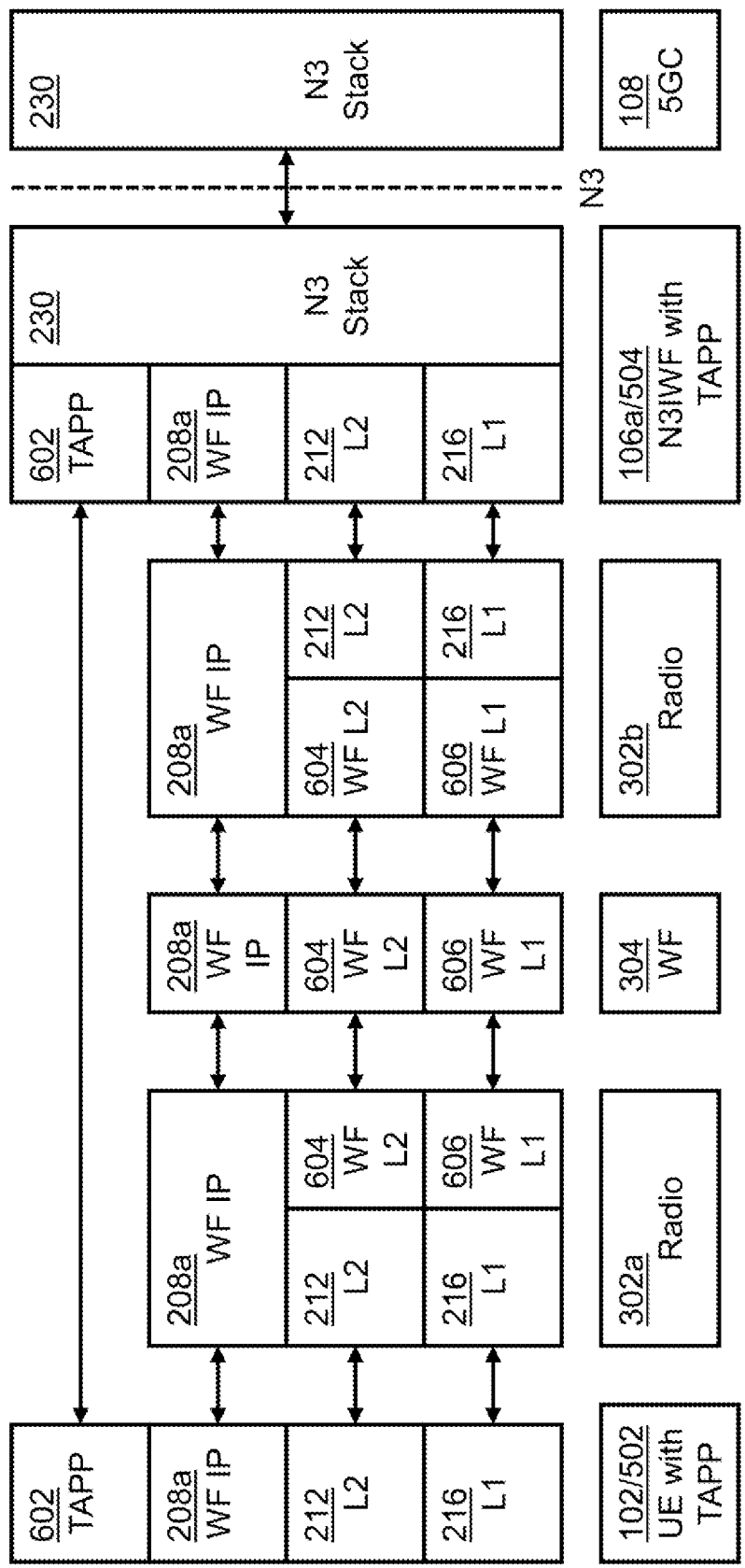
FIG. 7A depicts a protocol stack of a control plane before establishing a security association with a N3IWF, and depicts a UE and the N3IWF each including a TAPP, in accordance with one or more embodiments of the present disclosure.

FIG. 7A depicts the protocol stack 700a, in accordance with one or more embodiments of the present disclosure. The protocol stack 700a may depict the control plane before security authentication is established. In the protocol stack 700a, the UE 102 may or may not include a full stack according to the 3GPP UE specifications and may or may not be modified to execute the TAPP 502. The TAPP 502 may proxy one or more of the layers into the TAPP message 602. The TAPP message 602 may then be communicated from the UE 102 to the N3IWF 106a by the radio 302a, the secure non-3GPP waveform 304, and the radio 302b. The N3IWF 106a may include the TAPP 504 for rebuilding a message in accordance with 3GPP standards using the TAPP message 602.

Figure 7B:
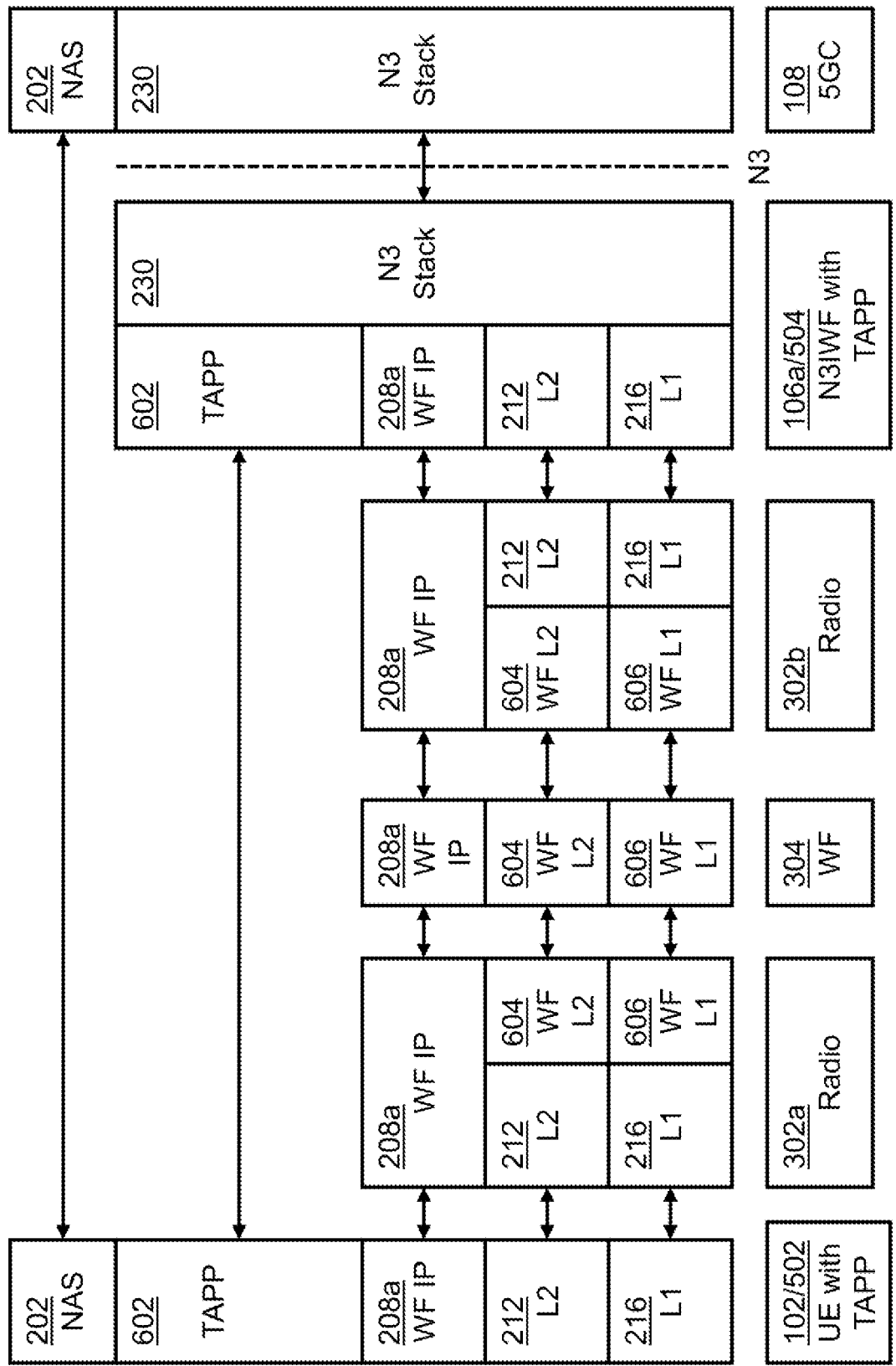
FIG. 7B depicts a protocol stack of a control plane after security association establishment with a N3IWF, and depicts a UE and the N3IWF each including a TAPP, in accordance with one or more embodiments of the present disclosure.

FIG. 7B depicts the protocol stack 700b, in accordance with one or more embodiments of the present disclosure. The protocol stack 700b may depict the control plane after security authentication is established. The UE 102 may include the TAPP 502. Optionally, one or more layers of the protocol stack of a message from the UE 102 may be proxied and removed by the TAPP 502. For example, the NAS 202, the EAP-5G 204, the IP 208, and/or the IPSec 224 layers may be proxied into the TAPP message 602. Alternatively, the UE 102 may be modified such that the layers are not added in the first place. The UE 102 may communicate with the function 106 by way of the radio 302a, the secure non-3GPP waveform 304, and the radio 302b. The function 106 (e.g., the N3IWF 106a) may include the TAPP 504 for rebuilding the message from the TAPP message 602.

Figure 7C:
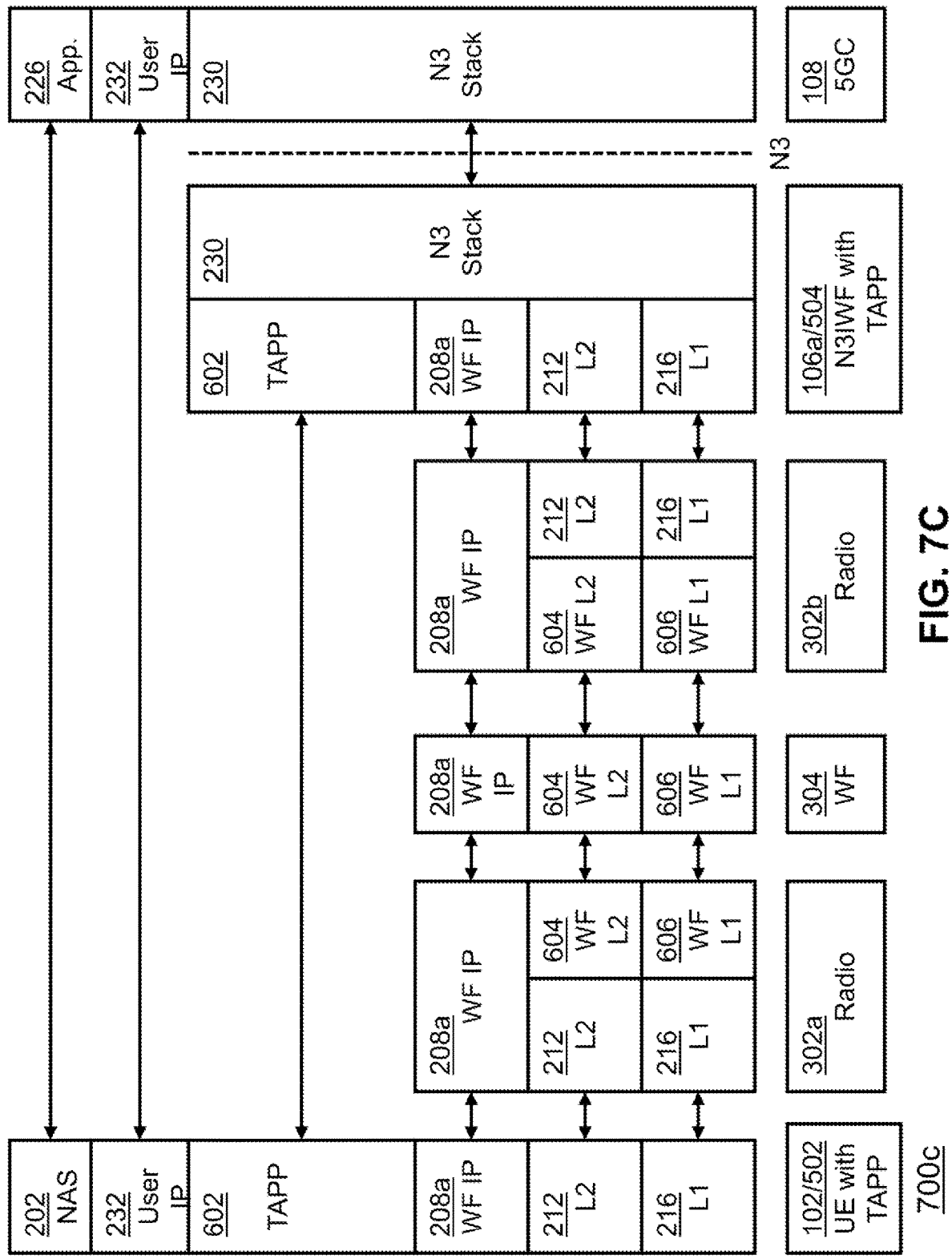
FIG. 7C depicts a protocol stack of a user plane after establishing a security association with a N3IWF, and depicts a UE and the N3IWF each including a TAPP, in accordance with one or more embodiments of the present disclosure.

FIG. 7C depicts the protocol stack 700c, in accordance with one or more embodiments of the present disclosure. The protocol stack 700c may depict the user plane after security authentication is established. The UE 102 may include the TAPP 502. One or more layers of the protocol stack of a message may be proxied and removed by the TAPP 502. Alternatively, the UE 102 may be modified such that the layers are not added in the first place. The UE 102 may communicate with the function 106 by way of the radio 302a, the secure non-3GPP waveform 304, and the radio 302b. The function 106 (e.g., the N3IWF 106a) may include the TAPP 504 for rebuilding the message from the TAPP message 602.

Figure 7D:
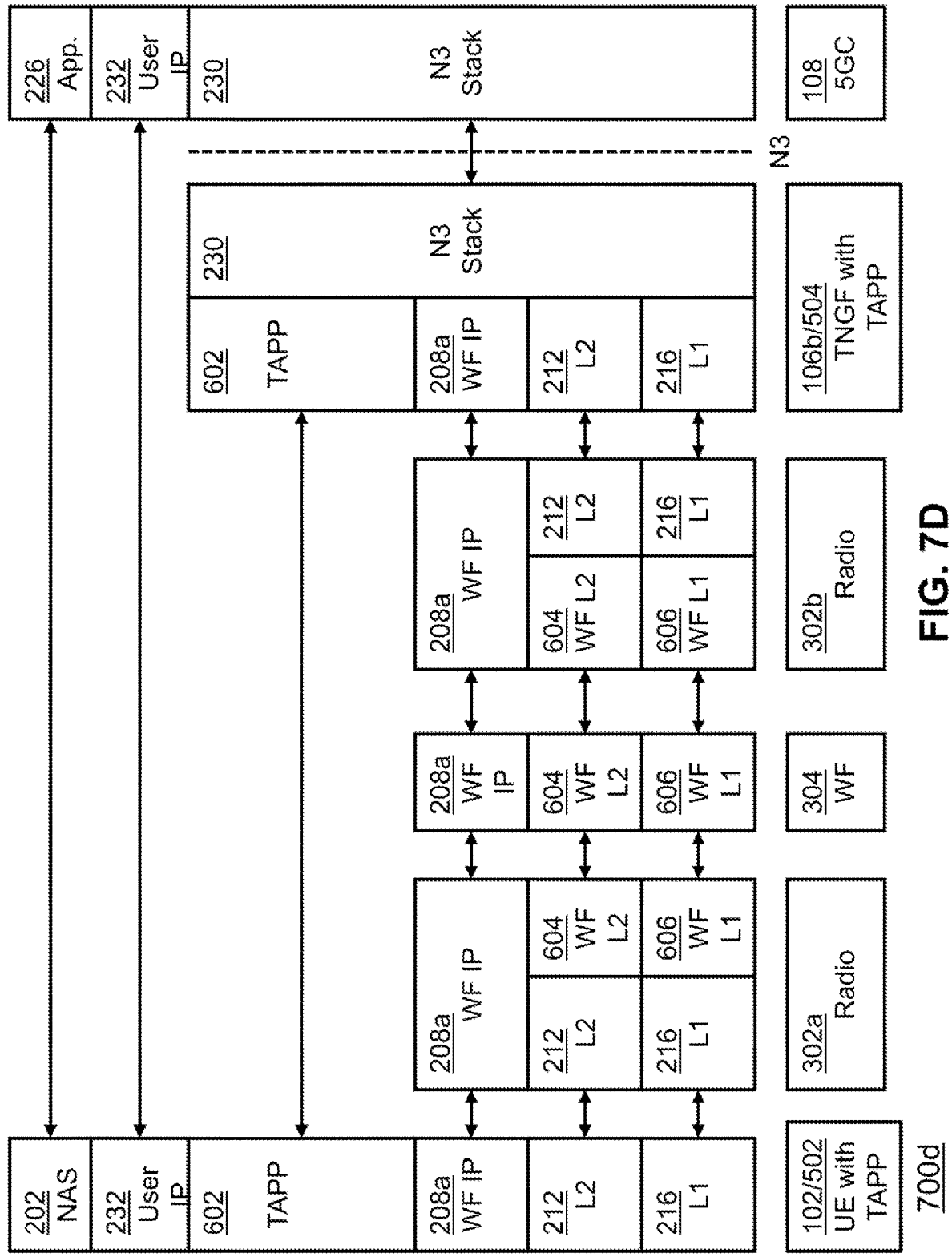
FIG. 7D depicts a protocol stack of a user plane with a TNGF, and depicts a UE and the TNGF each including a TAPP, in accordance with one or more embodiments of the present disclosure.

FIG. 7D depicts the protocol stack 700d for the User Plane with the function 106 being the TNGF 106b. The protocol stack 700d may be similar to the protocol stack 700c with the exception that the protocol stack 700d includes the TNGF 106b instead of the N3IWF 106a.

Referring now to FIGS. 8A-8D, a protocol stack 800 (e.g., protocol stack 800a, protocol stack 800b, protocol stack 800c, protocol stack 800d) is described, in accordance with one or more embodiments of the present disclosure. The TAPP hardware element may include the TAPP 502. The protocol stack 800 may depict the UE 102 connecting to the 5G core network 108 by way of the radios 302, the secure non-3GPP waveform 304, the TAPP 502, the TAPP 504, the TAPP hardware elements 506, and the function 106. The TAPP 502 and the TAPP 504 expands the interface availability of the 5G UE 102 from using Wi-Fi to reach an N3IWF or TNGF via a Wi-Fi Access Point, to further include accessing the function 106 by a non-3GPP waveform 304. In these examples, the TAPP hardware element 506a includes the TAPP 502 and the TAPP hardware element 506b includes the TAPP 504.

Figure 8A:
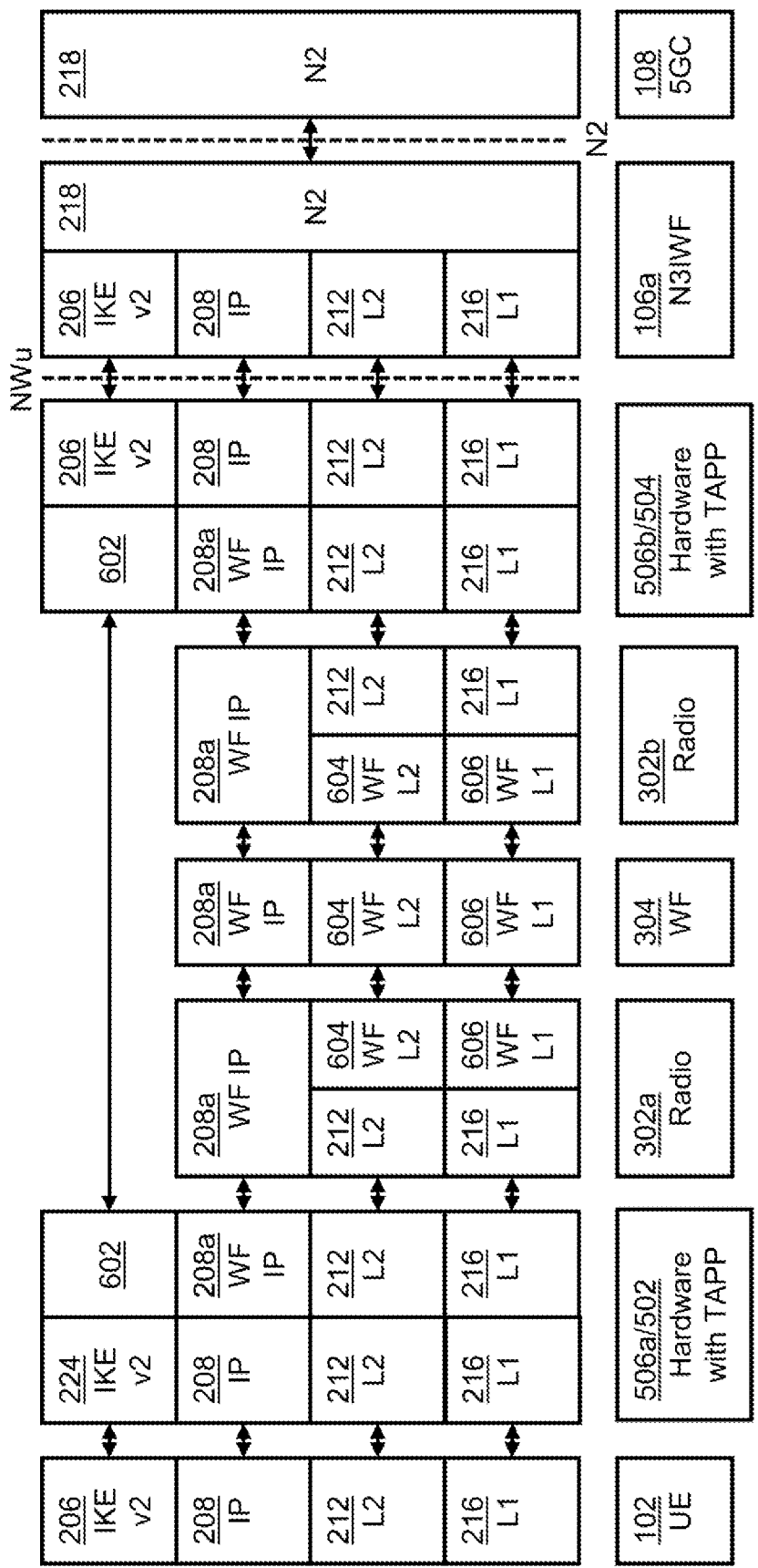
FIG. 8A depicts a protocol stack of a control plane before establishing a security association with a N3IWF, and depicts a first TAPP hardware element between a UE and a first radio, and depicts a second TAPP hardware element between a second radio and the N3IWF, in accordance with one or more embodiments of the present disclosure.

FIG. 8A depicts the protocol stack 800a, in accordance with one or more embodiments of the present disclosure. The protocol stack 800a may depict the control plane before security authentication is established. The TAPP hardware element 506a includes the TAPP 502. The TAPP 502 may proxy one or more layers into the TAPP message 602. The TAPP message 602 may then be communicated from the UE 102 to the N3IWF 106a by the radio 302a, the secure non-3GPP waveform 304, and the radio 302b. The TAPP hardware element 506b may include the TAPP 504 for rebuilding a message in accordance with 3GPP standards using the TAPP message 602.

Figure 8B:
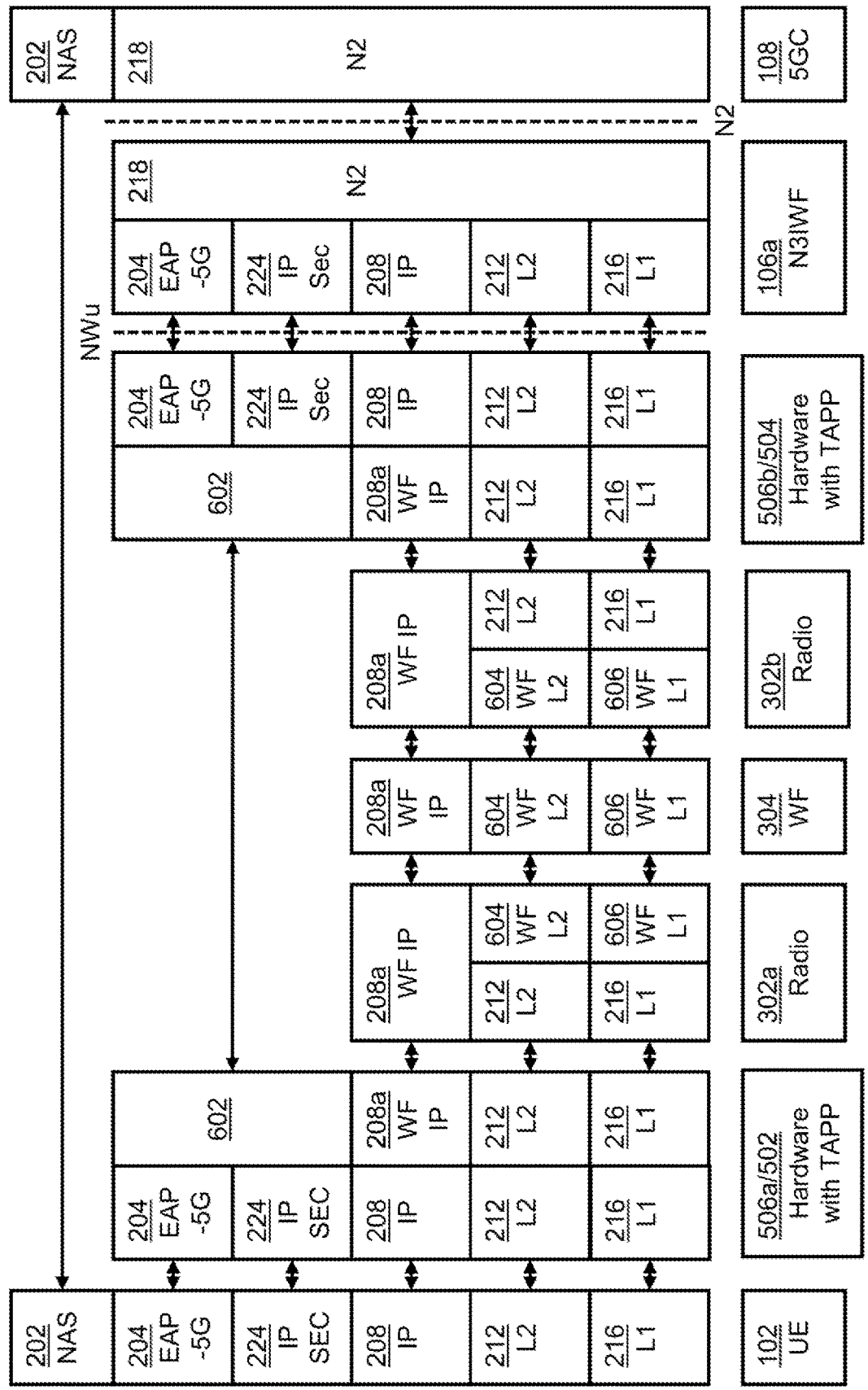
FIG. 8B depicts a protocol stack of a control plane after establishing a security association with a N3IWF, and depicts a first TAPP hardware element between a UE and a first radio, and depicts a second TAPP hardware element between a second radio and the N3IWF, in accordance with one or more embodiments of the present disclosure.

FIG. 8B depicts the protocol stack 800b, in accordance with one or more embodiments of the present disclosure. The protocol stack 800b may depict the control plane after security authentication is established. The TAPP hardware element 506a includes the TAPP 502. Optionally, one or more layers of the protocol stack of a message from the UE 102 may be proxied and removed by the TAPP 502. The UE 102 may communicate with the function 106 by way of the radio 302a, the secure non-3GPP waveform 304, and the radio 302b. The TAPP hardware element 606b may include the TAPP 504 for rebuilding the message from the TAPP message 602.

Figure 8C:
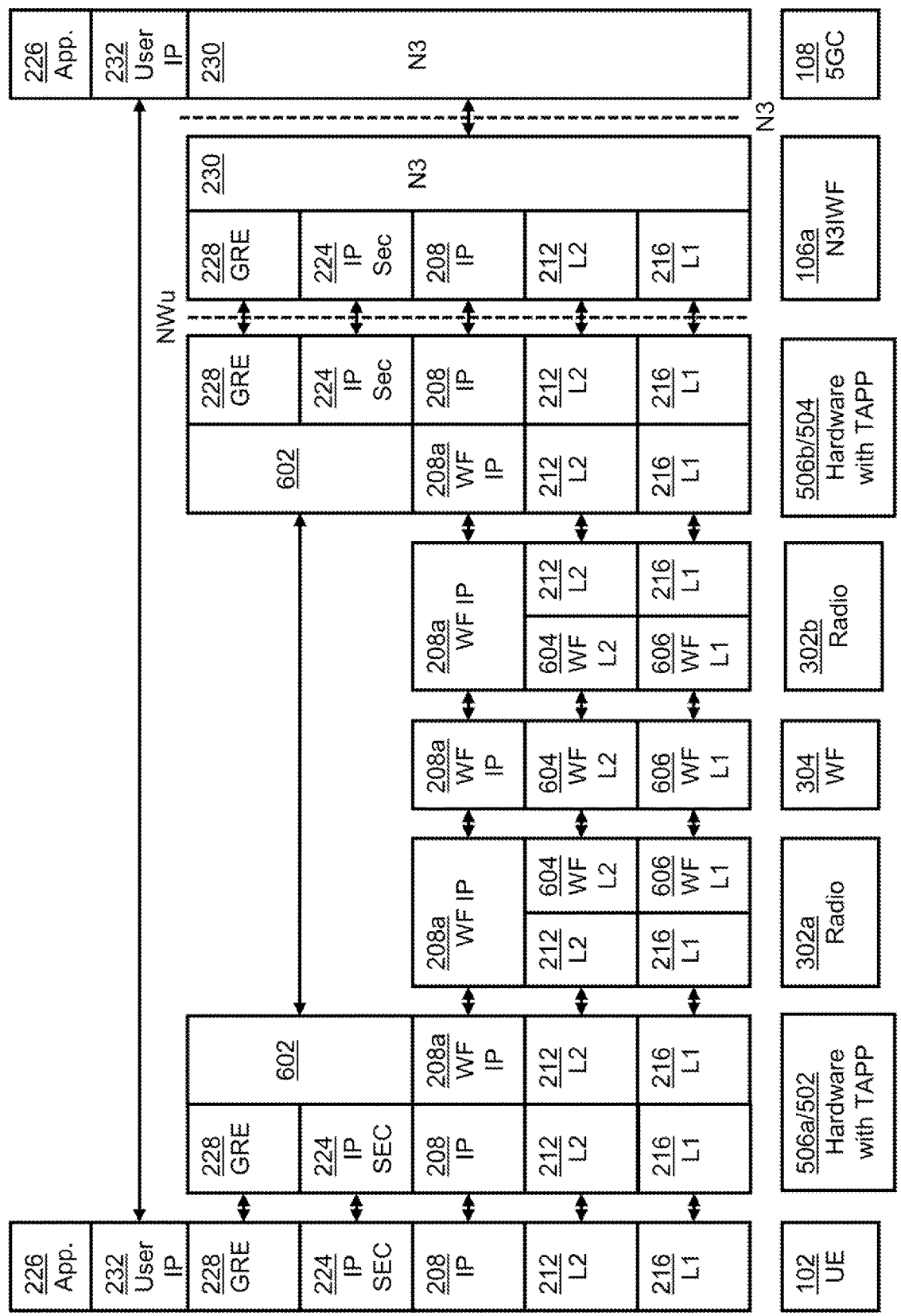
FIG. 8C depicts a protocol stack of a user plane after establishing a security association with a N3IWF, and depicts a first TAPP hardware element between a UE and a first radio, and depicts a second TAPP hardware element between a second radio and the N3IWF, in accordance with one or more embodiments of the present disclosure.

FIG. 8C depicts the protocol stack 800c, in accordance with one or more embodiments of the present disclosure. The protocol stack 800c may depict the user plane after security authentication is established. The TAPP hardware element 506a includes the TAPP 502. One or more layers of the protocol stack of a message may be proxied and removed by the TAPP 502. The UE 102 may communicate with the function 106 (e.g., the N3IWF 106a) by way of the radio 302a, the secure non-3GPP waveform 304, and the radio 302b. The TAPP hardware element 506b may include the TAPP 504 for rebuilding the message from the TAPP message 602.

Figure 8D:
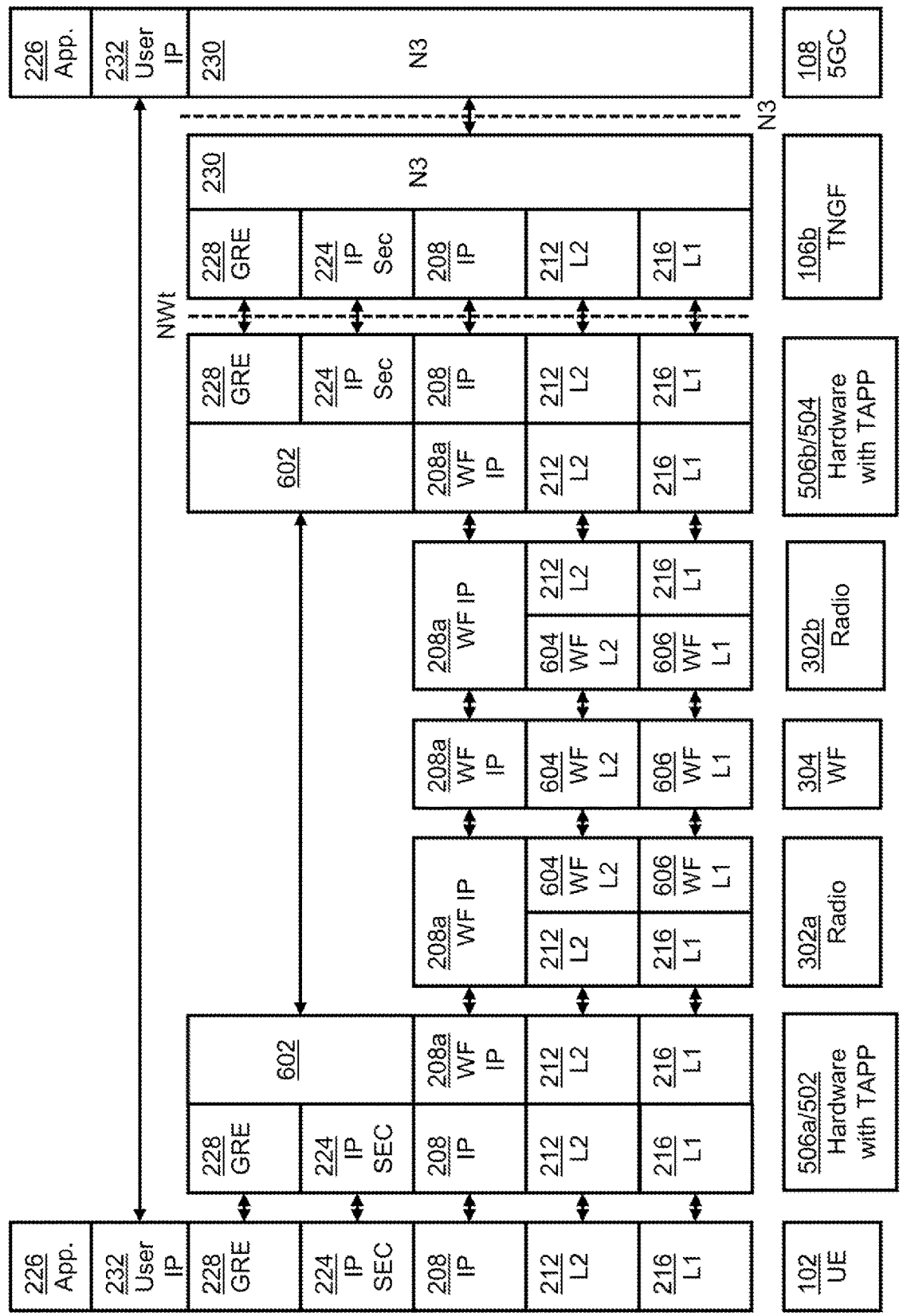
FIG. 8D depicts a protocol stack of a user plane with a TNGF, and depicts a first TAPP hardware element between a UE and a first radio, and depicts a second TAPP hardware element between a second radio and the TNGF, in accordance with one or more embodiments of the present disclosure.

FIG. 8D depicts the protocol stack 800d for the User Plane with the function 106 being the TNGF 106b. The protocol stack 800d may be similar to the protocol stack 800c with the exception that the protocol stack 800d includes the TNGF 106b instead of the N3IWF 106a.

Referring generally to FIGS. 9A-11B, proxying a full duplex voice communication into a format compatible with a secure non-3GPP waveform, is now described, in accordance with one or more embodiments of the present disclosure. Although much of the present disclosure has been directed to proxying the control plane and/or the user plane, this is not intended as a limitation of the present disclosure.

It is further contemplated that voice communication of the UE 102 may be proxied into a push-to-talk voice service.

5G cellular may include full duplex voice. The UE 102 may include a voice layer 226*a*. The voice layer 226*a* may be used for talking on the UE 102. When talking on the UE 102, Full duplex data is going one way and the data is coming back when talking on the UE 102. The full duplex data may allow for both participants to communicate at the same time. The full duplex data may include voice over IP (VOIP). The radio 302 and/or the secure non-3GPP waveform 304 may include a feature for Push-To-Talk (PTT) voice (e.g., PTT TAPP 602*a*). The PTT voice may include a built-in voice service with time slots, and the like. The voice is non-voice over IP (non-VoIP). The native voice service of the radio 302 may include PTT voice with an encryption layer (e.g., a trusted interface) or without an encryption layer (e.g., a non-trusted interface).

Part of the TAPP function (e.g., TAPP 502, TAPP 504) may include mapping the full duplex voice to half duplex voice. The TAPP 502 and the TAPP 504 may include a mode in which the full duplex voice is proxied into half-duplex for communication over the secure non-3GPP waveform 304. In this case, voice traffic is sent from the UE 102 to the TAPP 502. The voice traffic may be full duplex voice and/or VoIP. The TAPP 502 terminates all protocol layers, converts the voice traffic as needed (e.g., through use of a vocoder), and injects the voice packets directly into the secure non-3GPP waveform 304 as PTT voice. The VoIP may be mapped to the native voice service of the radio 302 (e.g., a non-3GPP radio). The native voice service of the radio 302 may be half-duplex voice, push-to-talk (PTT) half duplex, and/or non-VoIP. The half-duplex voice may then be sent across the secure non-3GPP waveform 304. On the other end of the secure non-3GPP waveform 304, the TAPP 504 converts the PTT voice packets back into voice traffic to send into the function 106 (e.g., N3IWF 106*a*, TNGF 106*b*, etc.). Any signaling between the TAPP 502 and the TAPP 504 may be treated as User Plane traffic.

The TAPP 502 may proxy one or more layers of the UE 102 and terminate the layers. For example, the TAPP 502 may proxy one or more of the voice layer 226*a*, the user IP 232, the GRE 228, the Inner IP 222, and/or the IPSec 224 layers into the PTT voice TAPP 602*a* and terminates the layers. The various layers may also be referred to as 3GPP full duplex voice function. The PTT TAPP 602*a* may also be referred to as a non-3GPP radio access technology (RAT) voice function. Thus, proxying the various layers into the PTT TAPP 602*a* may also be referred to as proxying a third-generation partnership project (3GPP) full duplex voice function into a non-3GPP radio access technology (RAT) voice function. The TAPP 502 may proxy the IP layer 208 into the waveform IP layer 208*a*. Alternatively, some non-3GPP RAT voice functions send the PTT voice directly over the WF L2 604 without using a WF IP 208*a*.

The TAPP 504 may rebuild the packet from the proxied communication. For example, the TAPP 502 may rebuild one or more of the Application layer 226 (e.g., the voice layer 226*a*), the user IP 232, the GRE 228, the Inner IP 222, and/or the IPSec 224 layers from the PTT voice TAPP 602*a*. The TAPP 504 may receive a PTT voice packet from the secure non-3GPP waveform 304, converting the push-to-talk voice packet into voice traffic, add one or more protocol layers to the voice traffic, and sending the voice traffic to a non-3GPP gateway including the function 106.

Although the non-3GPP voice function is described as being PTT voice, this is not intended as a limitation of the present disclosure. For example, the non-3GPP voice function may include full duplex voice or something other than VoIP. For instance, the radios 302 may include full duplex voice systems which don't operate with VoIP, but which do include two frequencies going back and forth in full duplex. The full duplex VoIP of the UE may thus be proxied into the full duplex non-VoIP of the radios 302. Similarly, the non-3GPP voice service may run directly over the WF L2 604 without using a WF IP 208*a*.

Figure 9A:
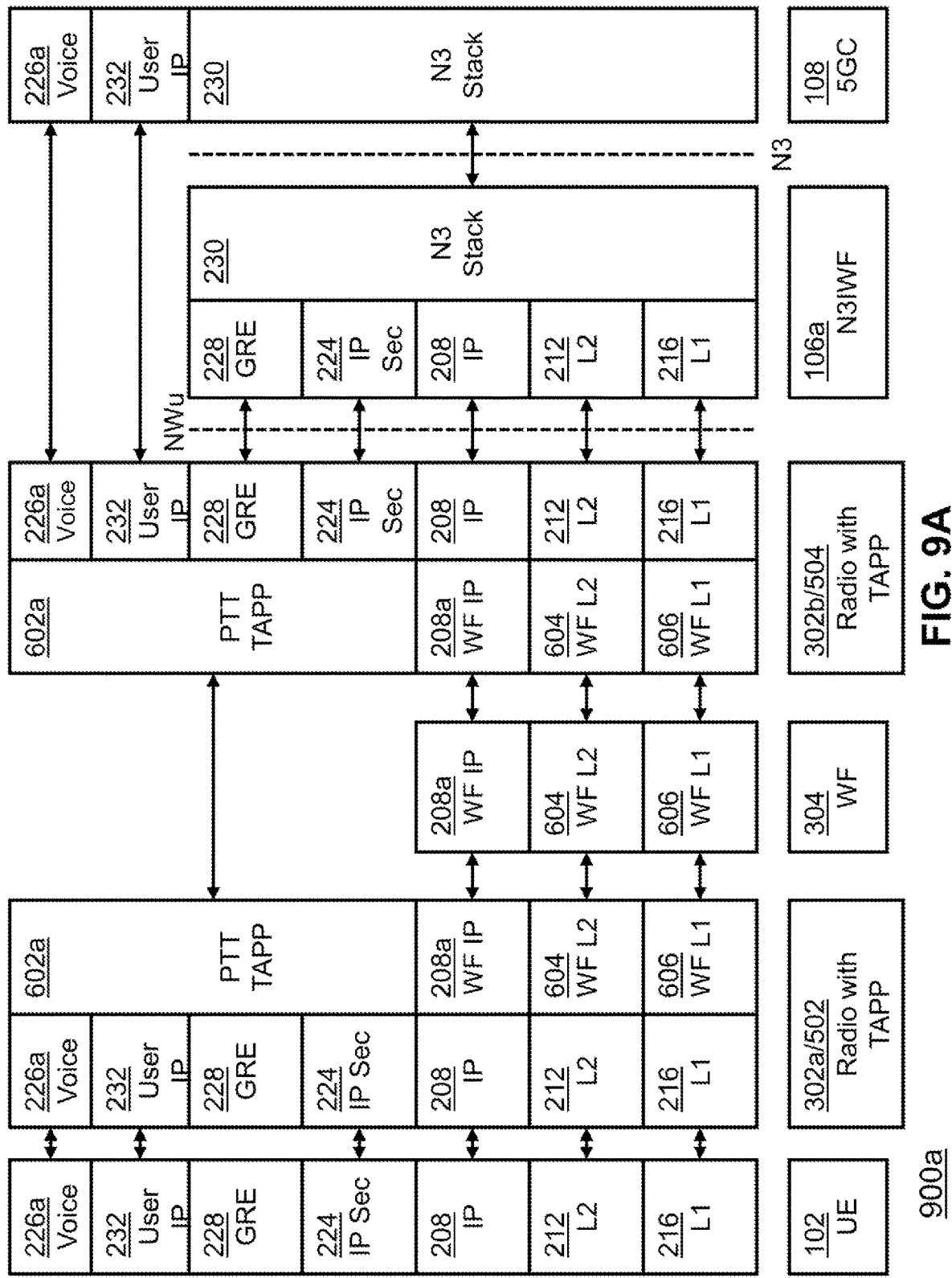
FIG. 9A depicts a protocol stack of a user plane for voice communications after establishing a security association with an N3IWF, and depicts two radios each including a TAPP, in accordance with one or more embodiments of the present disclosure.
Figure 9B:
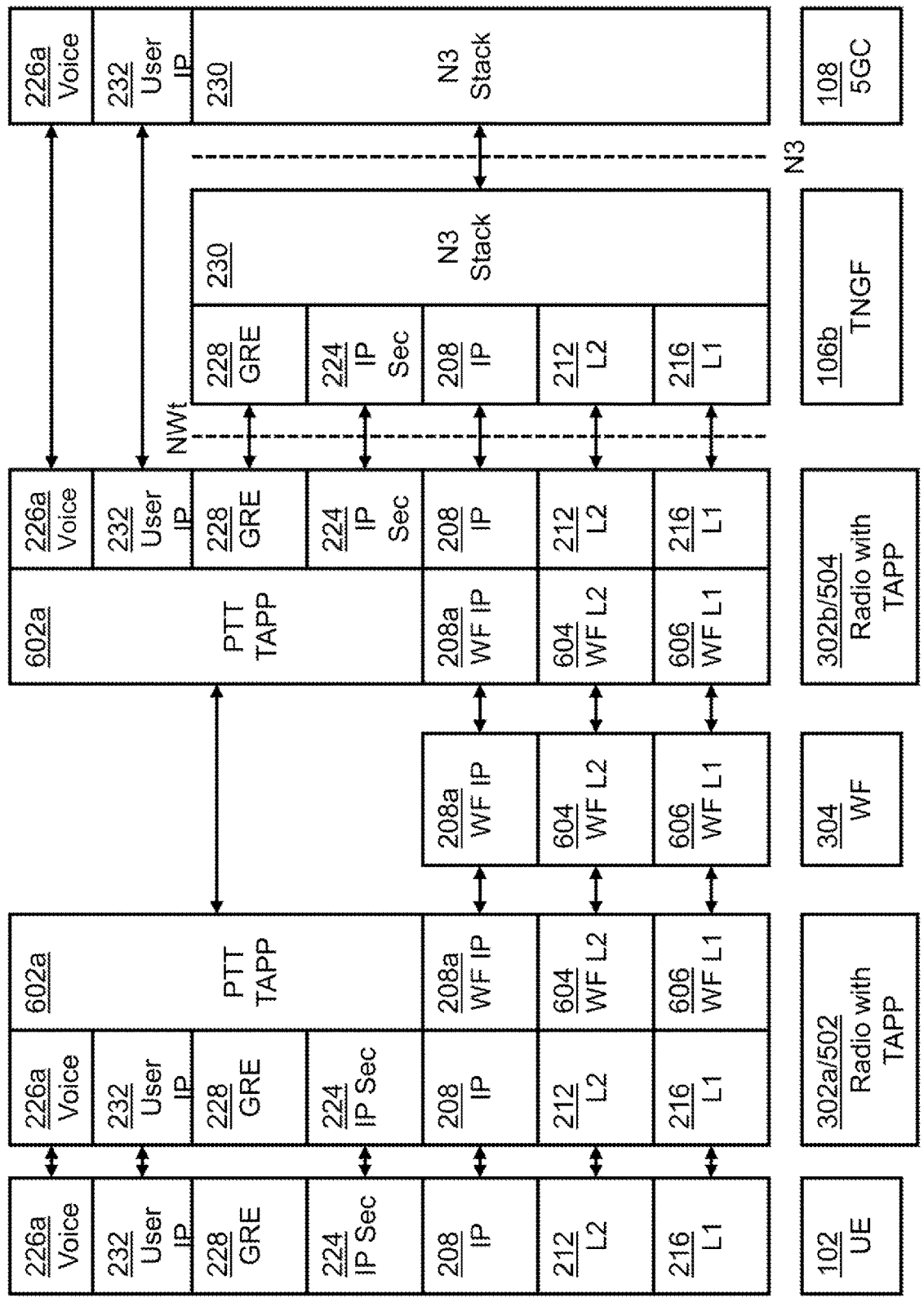
FIG. 9B depicts a protocol stack of a user plane for voice communications with an TNGF, and depicts two radios each including a TAPP, in accordance with one or more embodiments of the present disclosure.

Referring now to FIGS. 9A-9B, the TAPP 502 and the TAPP 504 with PTT voice handling using a 3GPP compatible UE is described, in accordance with one or more embodiments of the present disclosure. The radio 302*a* includes the TAPP 502. The TAPP 502 may proxy one or more layers of the UE 102. The radio 302*b* includes the TAPP 504. The TAPP 504 may rebuild the packet from the proxied communication.

In FIG. 9A, the function 106 is the N3IWF 106*a*. The radio 302*b* may include an NWu interface with the N3IWF 106*a*. In FIG. 9B, the function 106 is the TNGF 106*b*. The radio 302*b* may include an NWt interface with the TNGF 106*b*.

Figure 10A:
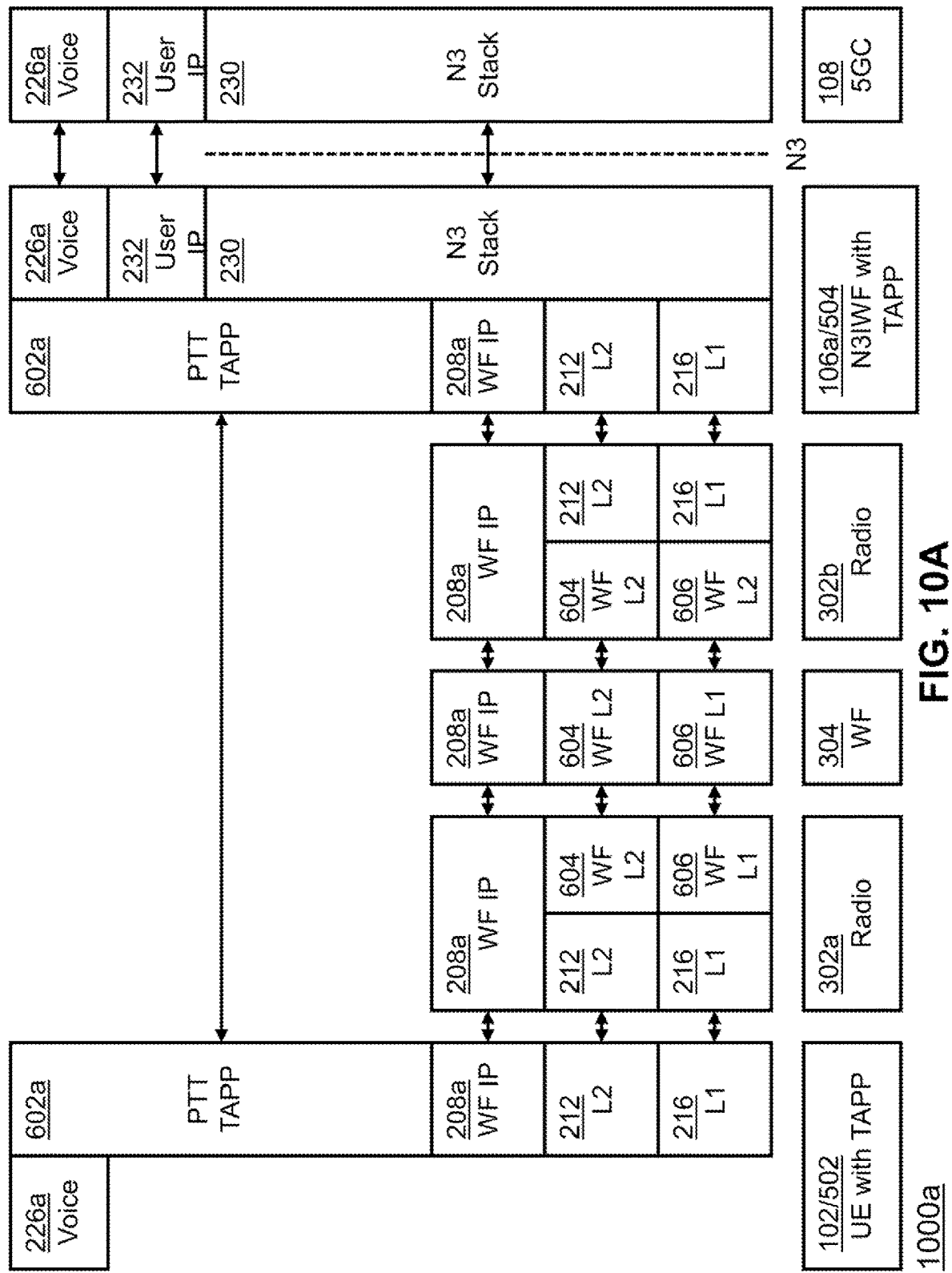
FIG. 10A depicts a protocol stack of a user plane for voice communications after establishing a security association with an N3IWF, and depicts a UE and the N3IWF each including a TAPP, in accordance with one or more embodiments of the present disclosure.
Figure 10B:
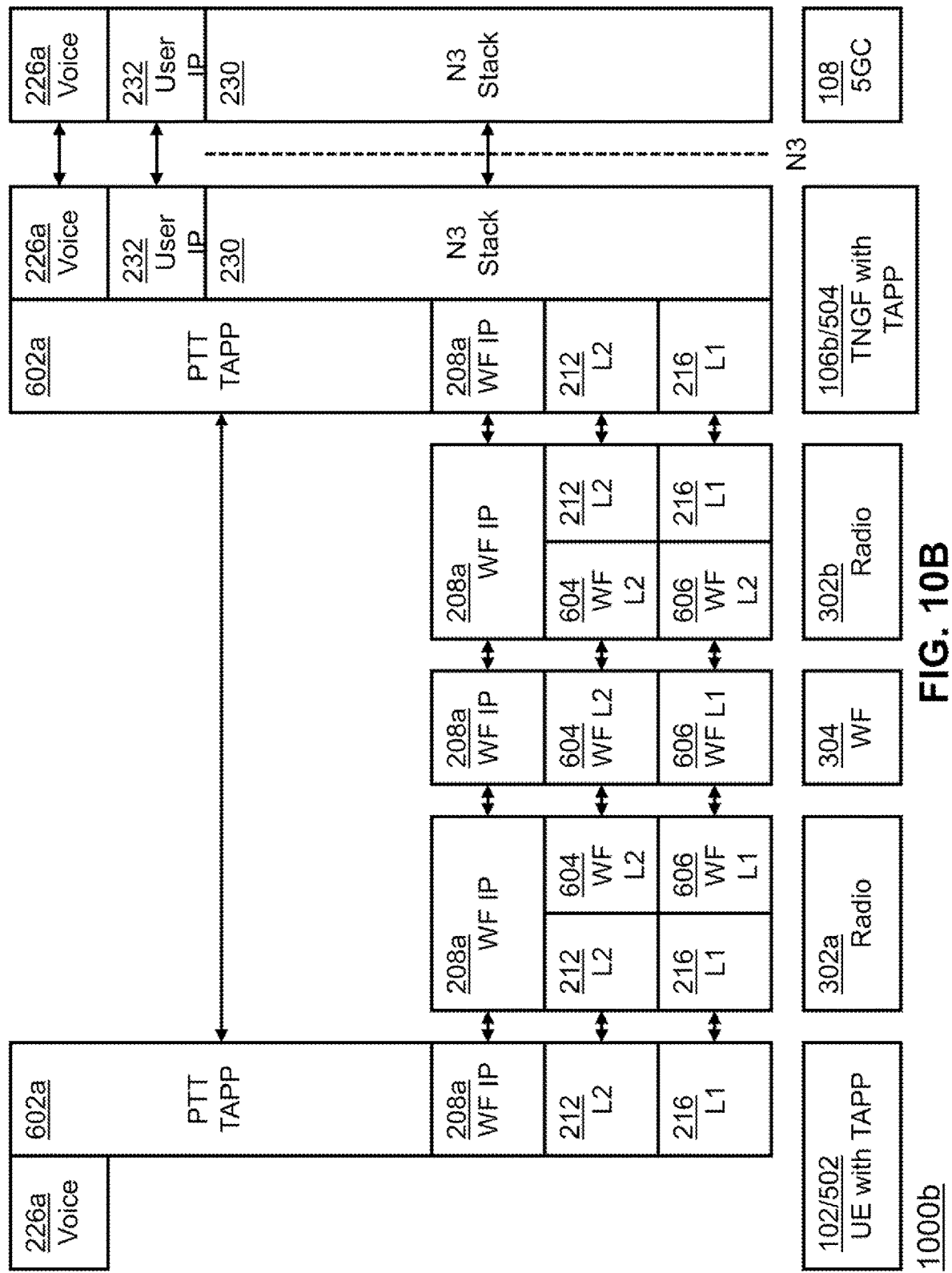
FIG. 10B depicts a protocol stack of a user plane for voice communications with a TNGF, and depicts a UE and the TNGF each including a TAPP, in accordance with one or more embodiments of the present disclosure.

Referring now to FIGS. 10A-10B, the TAPP 502 and the TAPP 504 with PTT voice handling using a modified UE and the function 106 is described, in accordance with one or more embodiments of the present disclosure. The UE 102 may include the TAPP 502. The TAPP 502 may proxy one or more layers of the UE 102. Although the TAPP 502 is described as proxying the layers, this is not intended as a limitation of the present disclosure. In some embodiments, the various layers are never added or a nulled by the UE 102. The radio 302*b* includes the TAPP 504. The TAPP 504 may rebuild the packet from the proxied communication.

In FIG. 10A, the function 106 is the N3IWF 106*a*. The radio 302*b* may include an NWu interface with the N3IWF 106*a*. In FIG. 10B, the function 106 is the TNGF 106*b*. The radio 302*b* may include an NWt interface with the TNGF 106*b*.

Figure 11A:
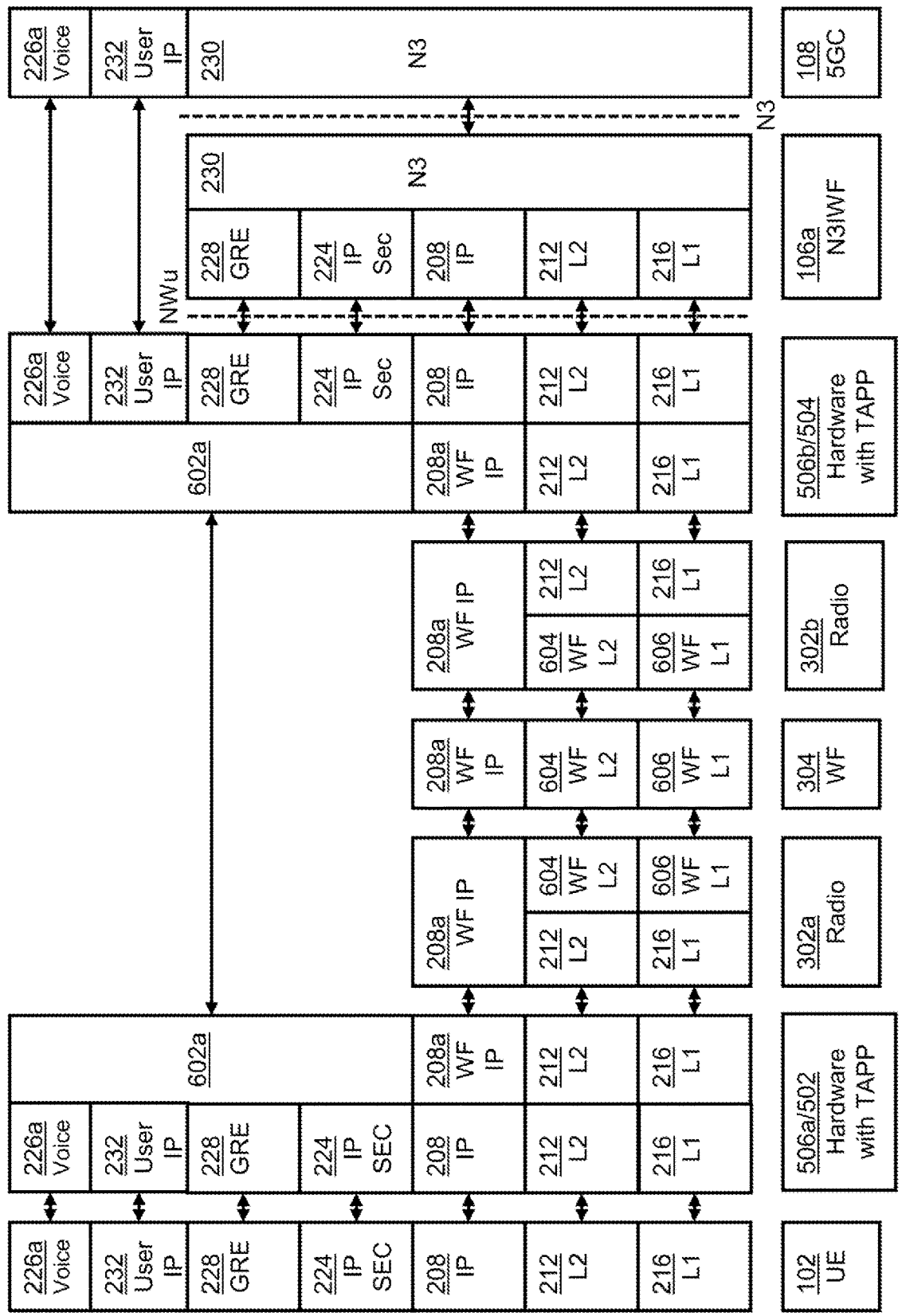
FIG. 11A depicts a protocol stack of a user plane for voice communications after establishing a security association with a N3IWF, and depicts a first TAPP hardware element between a UE and a first radio, and depicts a second TAPP hardware element between a second radio and the N3IWF, in accordance with one or more embodiments of the present disclosure.
Figure 11B:
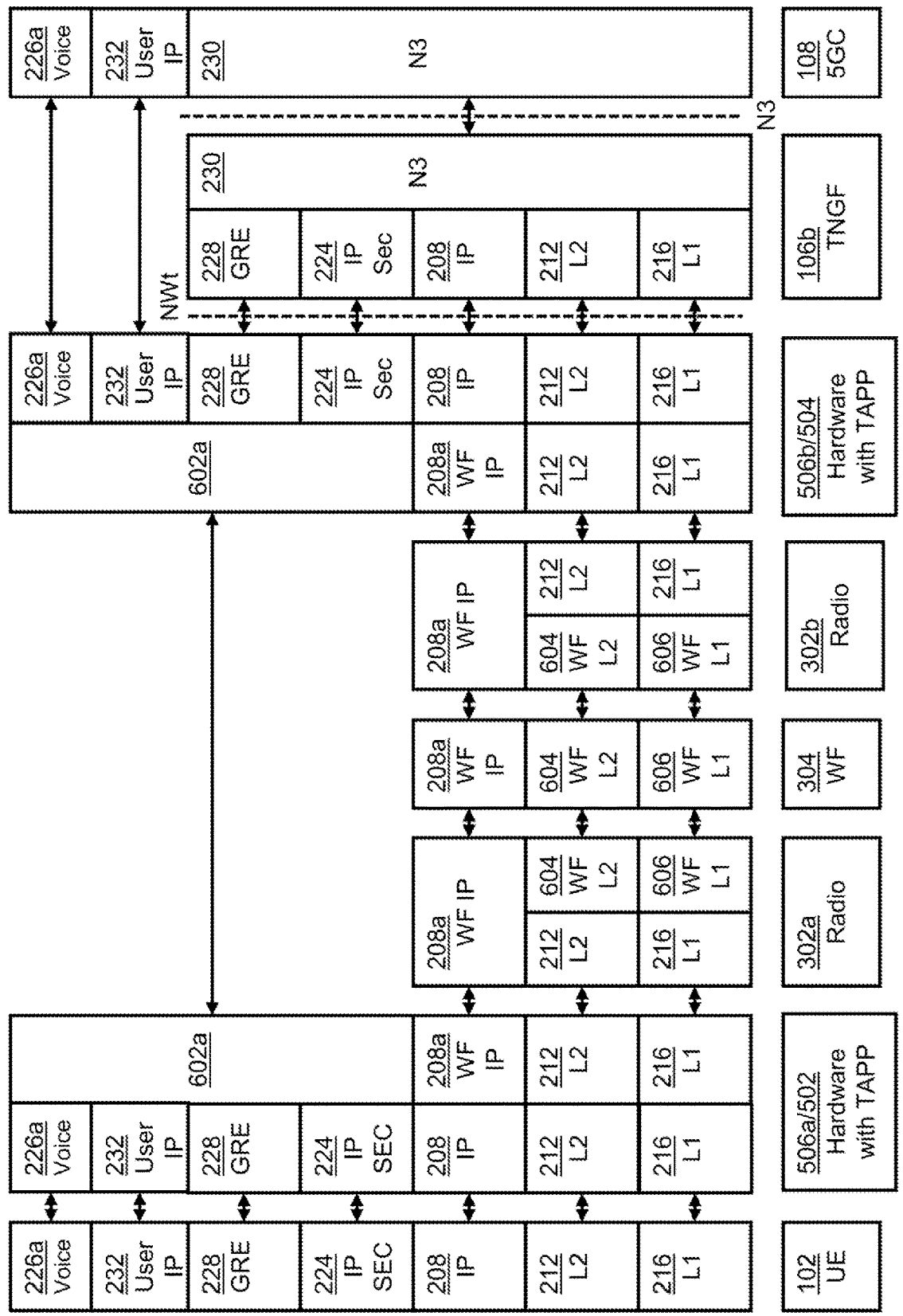
FIG. 11B depicts a protocol stack of a user plane for voice communications with a TNGF, and depicts a first TAPP hardware element between a UE and a first radio, and depicts a second TAPP hardware element between a second radio and the TNGF, in accordance with one or more embodiments of the present disclosure.

Referring now to FIGS. 11A-11B, the TAPP 502 and the TAPP 504 with PTT voice handling using two TAPP hardware elements is described, in accordance with one or more embodiments of the present disclosure. The TAPP hardware element 506*a* may include the TAPP 502. The TAPP 502 may proxy one or more layers of the UE 102. The radio 302*b* includes the TAPP 504. The TAPP 504 may rebuild the packet from the proxied communication.

In FIG. 11A, the function 106 is the N3IWF 106*a*. The radio 302*b* may include an NWu interface with the N3IWF 106*a*. In FIG. 11B, the function 106 is the TNGF 106*b*. The radio 302*b* may include an NWt interface with the TNGF 106*b*.

Referring generally again to FIGS. 1-11B, in the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although much of the present disclosure is directed to 5G new radio (5G NR), this is not intended as a limitation of the present disclosure. Proxying the functions may also be supported over a Long-Term Evolution (LTE) wireless broadband communication standard. Thus, the concepts of the present disclosure also apply to LTE with appropriate changes from the 5G NR interfaces to the LTE interfaces. Similarly, the concepts of the present disclosure also apply to 6G that is in development. In this regard, any 6G third-generation partnership project (3GPP) security function may be proxied into a non-3GPP security function for reducing overhead when communicating a message over a secure non-3GPP waveform.

One or more of the UE 102, the TAPP hardware elements 506, the radios 302, and/or the access points (e.g., function 106) may include memory and processor(s). The processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure. For example, the program instructions may include one or more of TAPP functions as described herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A system comprising:
a memory maintaining program instructions; and
a processor configured to execute the program instructions causing the processor to execute a tactical access point proxy (TAPP) function comprising:
proxying a third-generation partnership project (3GPP) security function into a non-3GPP security function for reducing overhead when communicating a message over a secure non-3GPP waveform; the overhead corresponding to messaging traffic from at least one of a control plane or a user plane of a 3GPP protocol stack used to connect a user equipment (UE) to a 3GPP core network by way of a non-3GPP RAT; wherein proxying the 3GPP security function comprises removing a plurality of protocol layers prior to transmitting the message across the secure non-3GPP waveform for reducing an over-the-air bandwidth of the transmission; wherein the plurality of protocol layers includes one or more protocol layers from the user plane; wherein the plurality of protocol layers are removed to reduce the overhead; wherein the one or more protocol layers comprise at least a Generic Routing Encapsulation (GRE) and an Internet protocol security (IPSec); wherein the TAPP function removes the GRE and IPSec overhead prior to being injected into the secure non-3GPP waveform;
wherein the program instructions cause the processor to execute a second tactical access point proxy (TAPP) function comprising proxying the non-3GPP security function into the 3GPP security function by adding the plurality of protocol layers in response to receiving a second message over the secure non-3GPP waveform; wherein the plurality of protocol layers includes one or more protocol layers from the user plane, wherein the GRE and the IPSec are added back to the second message by the second TAPP function.

2. The system of claim 1, further comprising a gateway; wherein the gateway is a non-3GPP gateway as defined by 3GPP standards; wherein the gateway comprises a non-3GPP interworking function (N3IWF): wherein the plurality of protocol layers includes one or more protocol layers from the control plane and the user plane; wherein the one or more protocol layers from the control plane includes at least an Extensible authentication protocol (EAP)-5G, wherein the EAP-5G is proxied into the message by the TAPP function, wherein the EAG-5G is added back to the second message by the second TAPP function.

3. The system of claim 1, comprising the UE and a radio; wherein the UE is configured to generate the message; wherein the UE is communicatively coupled to the radio; wherein the radio is configured to transmit the message and receive the second message over the secure non-3GPP waveform; wherein the UE includes the memory and the processor by which the UE is configured to proxy the 3GPP security function into the non-3GPP security function and to proxy the non-3GPP security function into the 3GPP security function.

4. The system of claim 1, comprising the UE and a radio; wherein the UE is configured to generate the message; wherein the UE is communicatively coupled to the radio; wherein the radio is configured to transmit the message and receive the second message over the secure non-3GPP waveform; wherein the radio is a software-defined radio that includes the memory and the processor by which the software-defined radio is configured to proxy the 3GPP security function into the non-3GPP security function and to proxy the non-3GPP security function into the 3GPP security function.

5. The system of claim 1, comprising the UE, a TAPP hardware element, and a radio; wherein the UE is configured to generate the message; wherein the TAPP hardware element is communicatively coupled between the UE and the radio; wherein the TAPP hardware element includes the memory and the processor; wherein the TAPP hardware element is configured to intercept the message between the UE and the radio and proxy the 3GPP security function into the non-3GPP security function; wherein the radio is configured to transmit the message over the secure non-3GPP waveform; wherein the radio is configured to receive the second message over the secure non-3GPP waveform; wherein the TAPP hardware element is configured to intercept the second message between the radio and the UE and proxy the non-3GPP security function into the 3GPP security function.

6. The system of claim 1, further comprising a radio and a gateway; wherein the radio is configured to transmit the message and receive the second message over the secure non-3GPP waveform; wherein the radio is communicatively coupled to the gateway; wherein the gateway comprises a non-3GPP gateway as defined by 3GPP standards; wherein the gateway is configured to communicate with the 3GPP core network; wherein the radio is a software-defined radio that includes the memory and the processor by which the software-defined radio is configured to proxy the 3GPP security function into the non-3GPP security function and to proxy the non-3GPP security function into the 3GPP security function.

7. The system of claim 1, further comprising a radio and a gateway; wherein the radio is configured to transmit the message and receive the second message over the secure non-3GPP waveform; wherein the radio is communicatively coupled to the gateway; wherein the gateway comprises a non-3GPP gateway as defined by 3GPP standards; wherein the gateway is configured to communicate with the 3GPP core network; wherein the gateway includes the memory and the processor by which the gateway is configured to proxy the 3GPP security function into the non-3GPP security function and to proxy the non-3GPP security function into the 3GPP security function.

8. The system of claim 1, further comprising a radio, a TAPP hardware element, and a gateway; wherein the radio is configured to transmit the message and receive the second message over the secure non-3GPP waveform; wherein the TAPP hardware element is communicatively coupled between the radio and the gateway; wherein the TAPP hardware element includes the memory and the processor; wherein the TAPP hardware element is configured to intercept the message between the gateway and the radio and proxy the 3GPP security function into the non-3GPP security function; wherein the TAPP hardware element is configured to intercept the second message between the radio and the gateway and proxy the non-3GPP security function into the 3GPP security function; wherein the gateway comprises a non-3GPP gateway as defined by 3GPP standards; wherein the gateway is configured to communicate with the 3GPP core network.

9. The system of claim 1, further comprising a gateway; wherein the gateway is a non-3GPP gateway as defined by 3GPP standards; wherein
the gateway comprises a trusted non-3GPP gateway function (TNGF).

10. The system of claim 1, further comprising the UE, a first software-defined radio, a second software-defined radio, and a non-3GPP gateway; wherein the UE is configured to communicate with the first software-defined radio; wherein the first software-defined radio is configured to communicate with the second software-defined radio by the secure non-3GPP waveform; wherein the second software-defined radio is configured to communicate with the non-3GPP gateway; wherein the non-3GPP gateway is configured to connect the UE to the 3GPP core network by way of the first software-defined radio, and the second software-defined radio.

11. The system of claim 1, wherein the program instructions are further configured to cause the processor to proxy a 3GPP full duplex voice function into a non-3GPP RAT voice function.

12. The system of claim 1, wherein proxying the 3GPP security function into the non-3GPP security function comprises-one of:
sending traffic on the control plane without modifying the 3GPP protocol stack and using a proxy message to coordinate the traffic.

13. The system of claim 11,
wherein proxying the 3GPP full duplex voice function into the non-3GPP RAT voice function is for reducing the overhead when communicating over the secure non-3GPP waveform; the overhead corresponding to the 3GPP protocol stack used to connect a user equipment (UE) to the 3GPP core network by way of a Wi-Fi access point.

14. The system of claim 13, wherein at least one of the 3GPP full duplex function is a voice-over-internet protocol (VoIP) or the non-3GPP voice function is push-to-talk (PTT) half duplex.

15. The system of claim 14, wherein proxying the 3GPP full duplex voice function into the non-3GPP RAT voice function comprises receiving voice traffic from the UE, terminating one or more protocol layers of the voice traffic, converting the voice traffic into a PTT voice packet, and injecting the PTT voice packet into the secure non-3GPP waveform; the system comprising at least one of the UE, a TAPP hardware element, or a software-defined radio; wherein at least one of the UE, the TAPP hardware element, or the software-defined radio includes the memory and the processor.

16. The system of claim 14, wherein the program instructions cause the processor to execute a second tactical access point proxy function (TAPP) comprising proxying the non-3GPP RAT voice into the 3GPP full duplex voice, wherein proxying the non-3GPP RAT voice into the 3GPP full duplex voice comprises receiving a PTT voice packet from the secure non-3GPP waveform, converting the PTT voice packet into voice traffic, adding one or more protocol layers to the voice traffic, and sending the voice traffic to a non-3GPP gateway; the system comprising at least one of a software-defined radio, a TAPP hardware element, or the non-3GPP gateway; wherein at least one of the software-defined radio, the TAPP hardware element, or the non-3GPP gateway includes the memory and the processor.

17. The system of claim 16, wherein the non-3GPP gateway includes at least one of a non-3GPP interworking function (N3IWF) or a trusted non-3GPP gateway function (TNGF).

18. The system of claim 1, wherein proxying the 3GPP security function into the non-3GPP security function comprises sending the traffic on the control plane before an initial security authentication without modifying the 3GPP protocol stack to create the initial security authentication between the UE and a non-3GPP gateway, using the proxy message to coordinate control plane traffic after the initial security authentication, and using the proxy message to coordinate the traffic.

19. The system of claim 1, wherein proxying the 3GPP security function into the non-3GPP security function comprises using the proxy message to coordinate all control plane traffic and user plane traffic.

20. The system of claim 1, wherein the secure non-3GPP waveform is selected from the Department of Defense (DoD) inventory (2022), wherein the secure non-3GPP waveform is one of Warrior Robust Enhanced Network (WREN), Link 16, Tactical Targeting Network Topology (TTNT), Multifunction Advanced Data Link (MADL), Intra-Flight Data Link (IFDL), Wideband Networking Waveform (WNW), or Soldier Radio Waveform (SRW).

* * * * *